United States Patent
Rapaz

(10) Patent No.: US 9,540,811 B2
(45) Date of Patent: *Jan. 10, 2017

(54) CONSTRUCTION PANEL

(71) Applicant: Antonio Rapaz, Chilliwack, CA (US)

(72) Inventor: Antonio Rapaz, Chilliwack, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/691,040

(22) Filed: Apr. 20, 2015

(65) Prior Publication Data

US 2015/0225950 A1    Aug. 13, 2015

Related U.S. Application Data

(63) Continuation of application No. 13/919,906, filed on Jun. 17, 2013, now Pat. No. 9,010,060, which is a
(Continued)

(51) Int. Cl.
*E04B 2/00* (2006.01)
*E04C 2/36* (2006.01)
(Continued)

(52) U.S. Cl.
CPC ............... *E04C 2/365* (2013.01); *E01C 5/001* (2013.01); *E01C 5/20* (2013.01); *E01C 5/223* (2013.01);
(Continued)

(58) Field of Classification Search
CPC .... E04F 15/04; E04F 15/02; E04F 2201/0115; E04B 2/7422; E04B 5/026; E04C 2/20; E04C 2/296; E04C 2/34; E04C 2/365; E04C 2002/05; E01C 5/20; E01C 11/225; E01C 9/086; E01C 5/223; E01C 2201/205; E01C 11/26; E01C 5/001; Y10T 428/139; Y10T 428/24289
(Continued)

(56) References Cited

U.S. PATENT DOCUMENTS 1,649,842 A    11/1927    McBride
2,956,785 A    10/1960    Riehl
(Continued)

FOREIGN PATENT DOCUMENTS

CA    2585349 A1    4/2007
DE    4304609 A1    12/1993
(Continued)

OTHER PUBLICATIONS

USPTO Office Action mailed Apr. 27, 2011 for U.S. Appl. No. 11/746,301, filed May 9, 2007 in the name of Antonio Rapaz.
(Continued)

*Primary Examiner* — Chi Q Nguyen
(74) *Attorney, Agent, or Firm* — Thomas W. Bailey; Oyen Wiggs Green & Mutala LLP

(57) ABSTRACT

This application relates to a light-weight, multi-purpose construction panel. The panel may be formed, for example, from molded plastic. Each panel includes a substantially planar deck on a first side thereof and a second side comprising alternating male and female sleeves arranged in honeycomb-like compartments defined by a plurality of wall elements. A pair of panels may be releasably coupled together with their respective second sides facing inwardly to form a construction assembly. When a pair of panels is coupled together, the male sleeves of one panel matingly fit within the females sleeves of the other panel, and vice versa. The panel assemblies may be used for many different construction applications including flooring, roofing and wall structures.

28 Claims, 26 Drawing Sheets

Related U.S. Application Data continuation-in-part of application No. 11/874,388, filed on Oct. 18, 2007, now Pat. No. 8,464,490, which is a continuation-in-part of application No. 11/746,301, filed on May 9, 2007, now abandoned.

(51) Int. Cl.

| | | |
|---|---|---|
| *E04C 2/34* | (2006.01) | |
| *E01C 5/00* | (2006.01) | |
| *E01C 5/20* | (2006.01) | |
| *E04C 2/20* | (2006.01) | |
| *E04B 5/02* | (2006.01) | |
| *E01C 9/08* | (2006.01) | |
| *E01C 11/26* | (2006.01) | |
| *E01C 5/22* | (2006.01) | |
| *E01C 11/22* | (2006.01) | |
| *E04C 2/00* | (2006.01) | |

(52) U.S. Cl.
CPC .............. *E01C 9/086* (2013.01); *E01C 11/26* (2013.01); *E04B 5/026* (2013.01); *E04C 2/20* (2013.01); *E04C 2/34* (2013.01); *E01C 11/225* (2013.01); *E01C 2201/205* (2013.01); *E04C 2002/005* (2013.01); *Y10T 428/139* (2015.01); *Y10T 428/24289* (2015.01)

(58) Field of Classification Search
USPC .................. 52/782.1, 783.1, 796.1, 800.16, 204.72,52/718.04, 718.01, 578, 589.1, 574, 588.1,52/592.1, 591.1, 592.5, 592.6; 428/36.9, 115, 428/116, 133
See application file for complete search history.

(56) References Cited

U.S. PATENT DOCUMENTS

| | | | |
|---|---|---|---|
| 3,005,282 A | 10/1961 | Godtfred | |
| 3,886,706 A | 6/1975 | Baker | |
| 4,012,882 A | 3/1977 | Juriss et al. | |
| 4,495,237 A | 1/1985 | Patterson | |
| 4,576,221 A | 3/1986 | Fennesz | |
| 4,843,976 A | 7/1989 | Pigott et al. | |
| 5,197,244 A | 3/1993 | Takeda et al. | |
| 5,197,395 A | 3/1993 | Pigott et al. | |
| 5,373,661 A | 12/1994 | Furukawa | |
| 5,411,782 A | 5/1995 | Jarvis et al. | |
| 5,437,698 A | 8/1995 | Furukawa | |
| 5,452,667 A | 9/1995 | Lim | |
| 5,470,641 A | 11/1995 | Shuert | |
| 5,471,806 A | 12/1995 | Rokhlin | |
| 5,509,472 A | 4/1996 | Tamura et al. | |
| 5,566,519 A | 10/1996 | Almaraz-Miera | |
| 5,740,858 A | 4/1998 | Ingram | |
| 5,894,706 A | 4/1999 | Herbst | |
| 5,930,970 A | 8/1999 | De Le fevre | |
| 6,029,583 A | 2/2000 | LeTrudet | |
| 6,050,044 A * | 4/2000 | McIntosh | ...................... 52/591.1 |
| 6,061,982 A | 5/2000 | Owen | |
| 6,092,587 A | 7/2000 | Ingram | |
| 6,187,401 B1 | 2/2001 | Heisel et al. | |
| 6,467,224 B1 | 10/2002 | Bertolini | |
| 6,511,257 B1 | 1/2003 | Seaux et al. | |
| 6,571,525 B2 | 6/2003 | Coleman | |
| 6,598,366 B2 | 7/2003 | Hsieh | |
| 6,631,603 B2 | 10/2003 | Zornes | |
| 6,668,515 B2 | 12/2003 | Bertin | |
| 6,685,388 B2 | 2/2004 | Webster et al. | |
| 6,802,159 B1 | 10/2004 | Kotler | |
| 6,886,475 B2 | 5/2005 | Apps et al. | |
| 6,986,227 B1 | 1/2006 | Gavin | |
| 7,090,911 B2 | 8/2006 | Lascelles | |
| 7,114,298 B2 | 10/2006 | Kotler | |
| 7,140,426 B2 | 11/2006 | Huebner et al. | |
| 7,303,800 B2 | 12/2007 | Rogers | |
| 7,413,374 B2 | 8/2008 | Rogers et al. | |
| 7,698,859 B2 | 4/2010 | Sansano | |
| 7,704,011 B2 | 4/2010 | Marshall | |
| 7,779,764 B2 * | 8/2010 | Naidu et al. | ................ 108/57.26 |
| 7,914,228 B2 * | 3/2011 | Rapaz | .............. 404/34 |
| 8,141,314 B2 | 3/2012 | Rosan | |
| 8,464,490 B2 * | 6/2013 | Rapaz | ......................... 52/592.1 |
| 9,010,060 B2 * | 4/2015 | Rapaz | ......................... 52/592.1 |
| 2001/0003888 A1 | 6/2001 | Bertin | |
| 2003/0084626 A1 | 5/2003 | Hsieh et al. | |
| 2003/0188505 A1 * | 10/2003 | Marshall | ........................ 52/606 |
| 2005/0204695 A1 | 9/2005 | Blazevic | |
| 2005/0224690 A1 | 10/2005 | Hobbs | |
| 2006/0265987 A1 | 11/2006 | Iannone | |
| 2006/0272252 A1 | 12/2006 | Moller | |
| 2007/0169432 A1 | 7/2007 | Bridge | |
| 2007/0266667 A1 | 11/2007 | Rapaz | |
| 2007/0266669 A1 * | 11/2007 | Rapaz | ......................... 52/638 |
| 2008/0121381 A1 | 5/2008 | So et al. | |
| 2009/0044484 A1 | 2/2009 | Berger | |
| 2009/0313915 A1 | 12/2009 | Kellner | |

FOREIGN PATENT DOCUMENTS

| | | |
|---|---|---|
| DE | 9313243 | 12/1993 |
| DE | 29807102 | 8/1998 |
| EP | 1400638 A1 | 3/2004 |
| JP | 08174730 A | 7/1996 |
| WO | 9936638 A1 | 7/1999 |
| WO | 0214608 A1 | 2/2002 |
| WO | 2005081923 A2 | 9/2005 |
| WO | 2006014857 A1 | 2/2006 |

OTHER PUBLICATIONS

USPTO Office Action mailed Feb. 17, 2012 for U.S. Appl. No. 11/746,301, filed May 9, 2007 in the name of Antonio Rapaz.
USPTO Office Action mailed Feb. 1, 2013 for U.S. Appl. No. 11/746,301, filed May 9, 2007 in the name of Antonio Rapaz.
USPTO Office Action dated Nov. 12, 2009 for U.S. Appl. No. 11/874,388, filed Oct. 18, 2007 in the name of Antonio Rapaz.
USPTO Office Action (Ex Parte Quayle) dated Jul. 21, 2010 for U.S. Appl. No. 11/874,388, filed Oct. 18, 2007 in the name of Antonio Rapaz.
USPTO Office Action dated Dec. 10, 2010 for U.S. Appl. No. 11/874,388, filed Oct. 18, 2007 in the name of Antonio Rapaz.
USPTO Office Action dated Sep. 14, 2011 for U.S. Appl. No. 11/874,388, filed Oct. 18, 2007 in the name of Antonio Rapaz.
USPTO Office Action mailed Jul. 20, 2012 for U.S. Appl. No. 11/874,388, filed Oct. 18, 2007 in the name of Antonio Rapaz.
Notice of Allowance mailed Feb. 20, 2013 for U.S. Appl. No. 11/874,388, filed Oct. 18, 2007 in the name of Antonio Rapaz.
USPTO Office Action mailed Aug. 14, 2013 for U.S. Appl. No. 13/919,606, filed Jun. 17, 2013 in the name of Antonio Rapaz.
USPTO Office Action mailed May 23, 2014 for U.S. Appl. No. 13/919,606, filed Jun. 17, 2013 in the name of Antonio Rapaz.
Notice of Allowance mailed Dec. 19, 2014 for U.S. Appl. No. 13/919,906, filed Jun. 17, 2013 in the name of Antonio Rapaz.

* cited by examiner

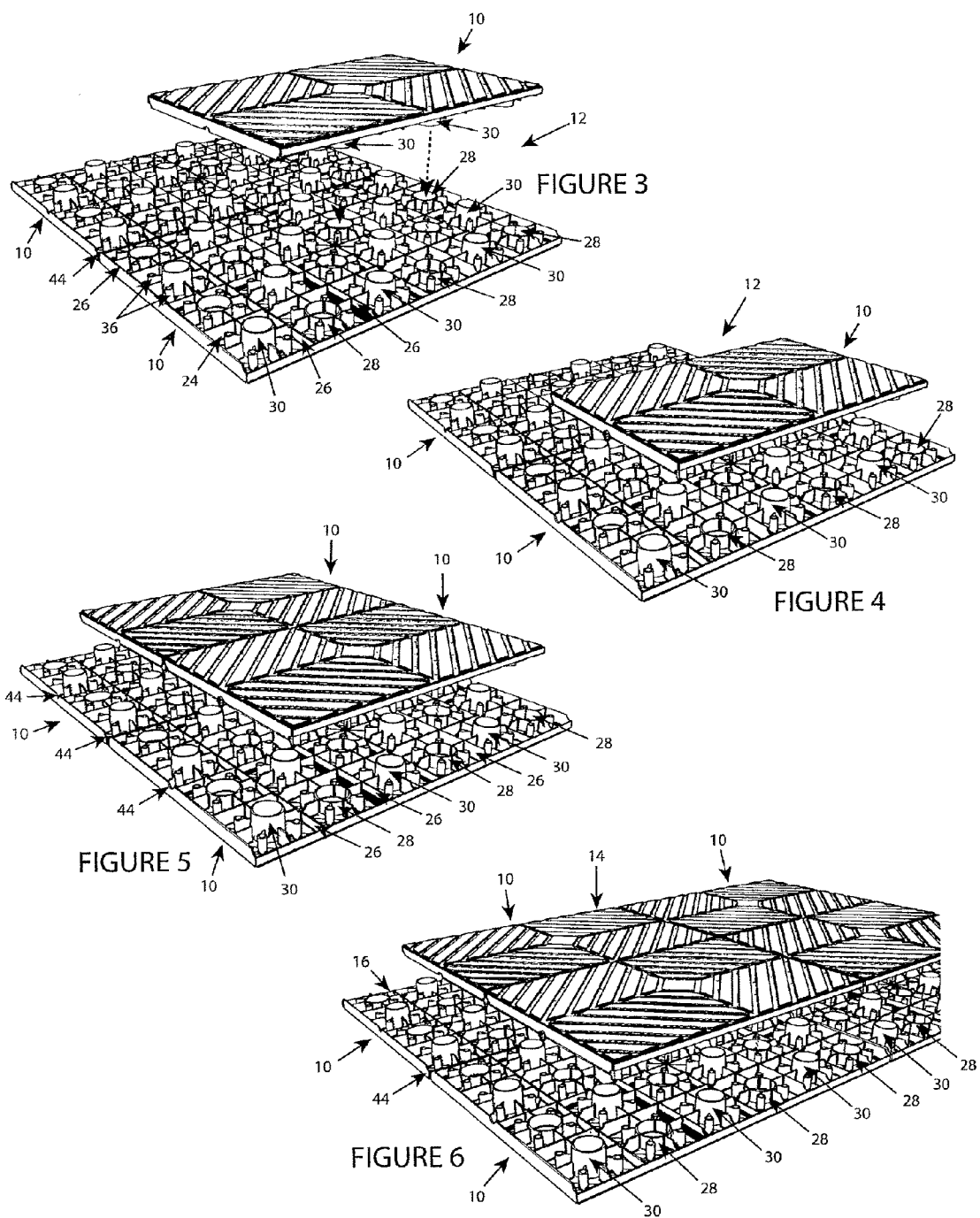

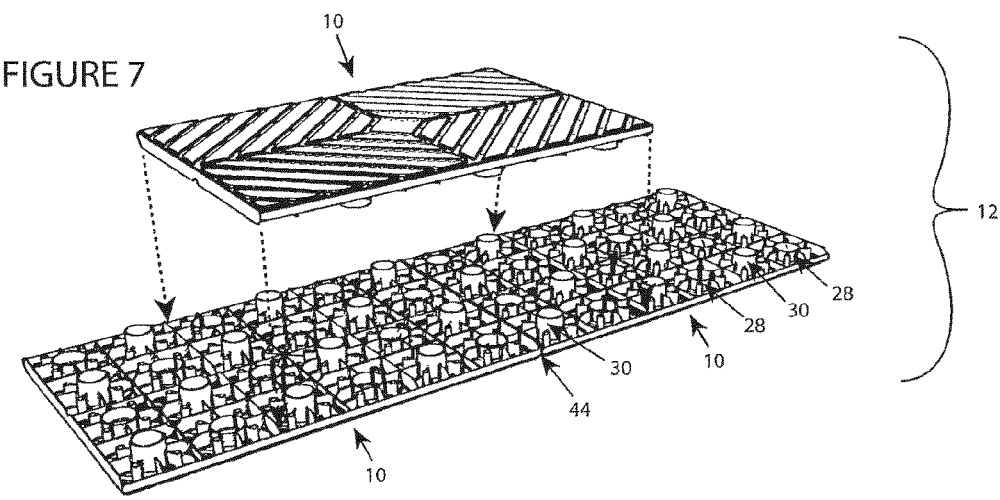
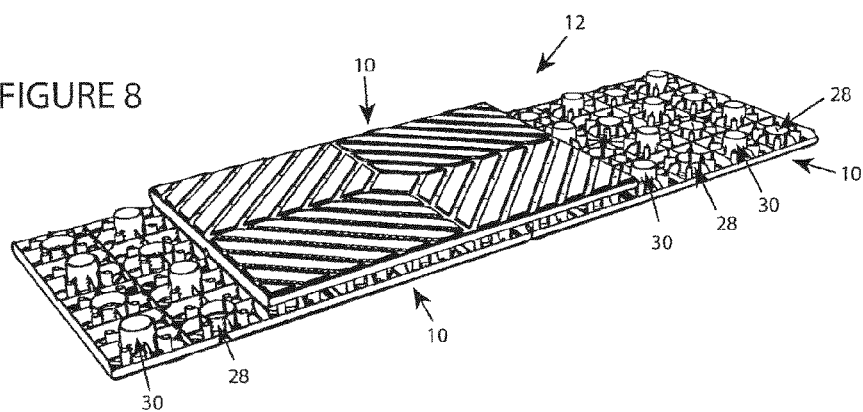
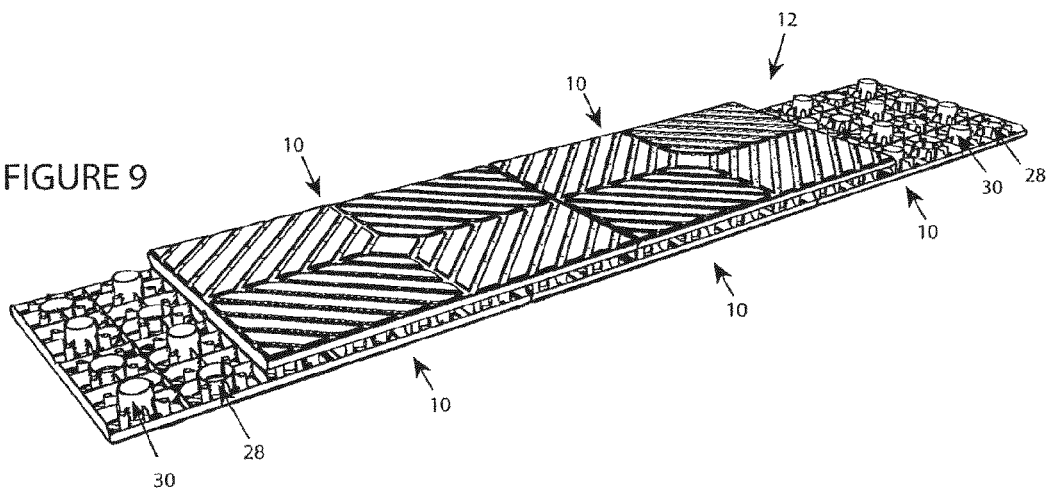

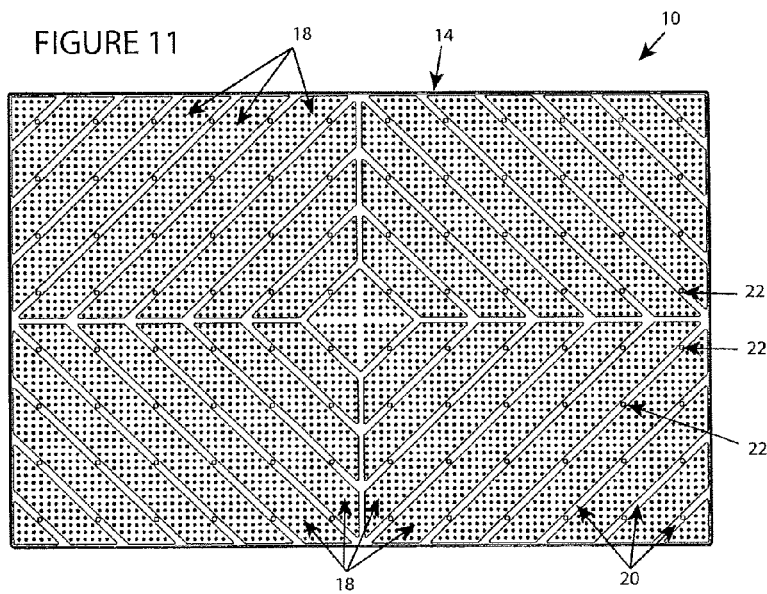
FIGURE 11
FIGURE 12
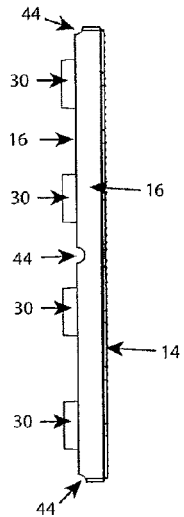
FIGURE 13 (a)
FIGURE 13 (b)
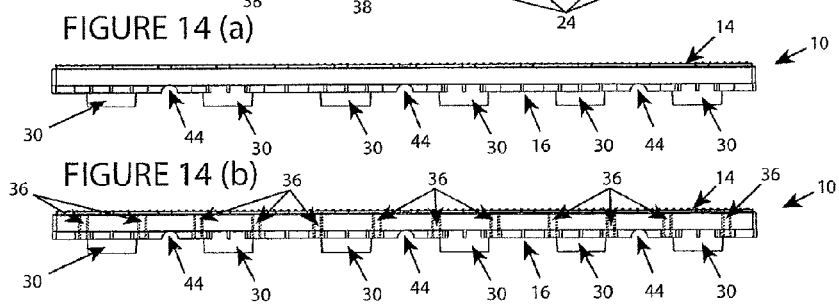
FIGURE 14 (a)
FIGURE 14 (b)

FIG. 39
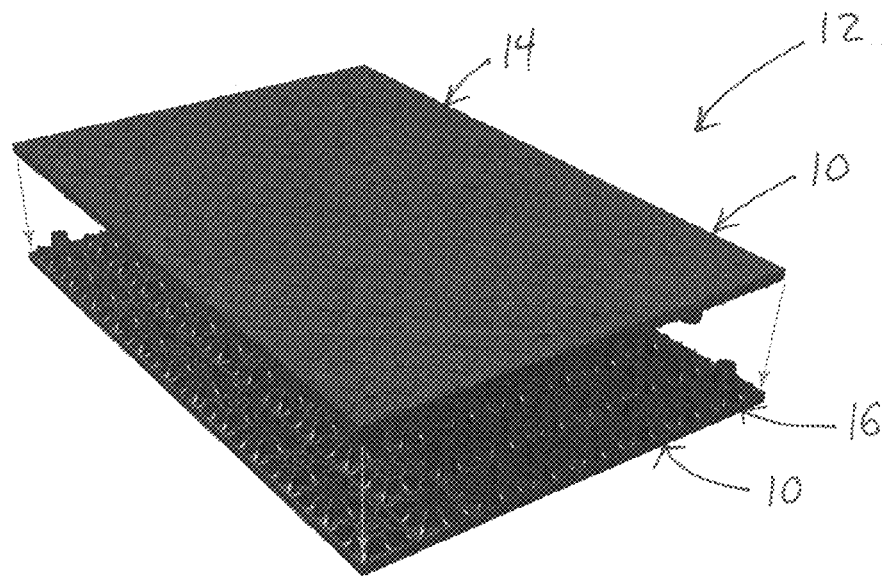
FIG. 40
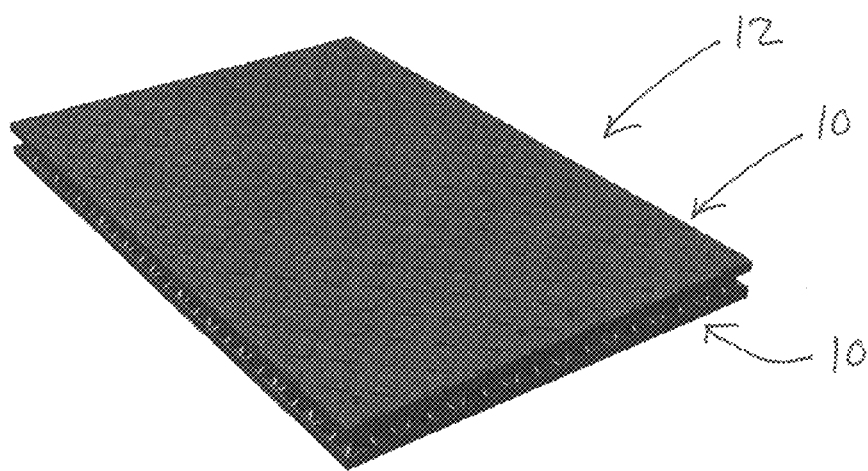
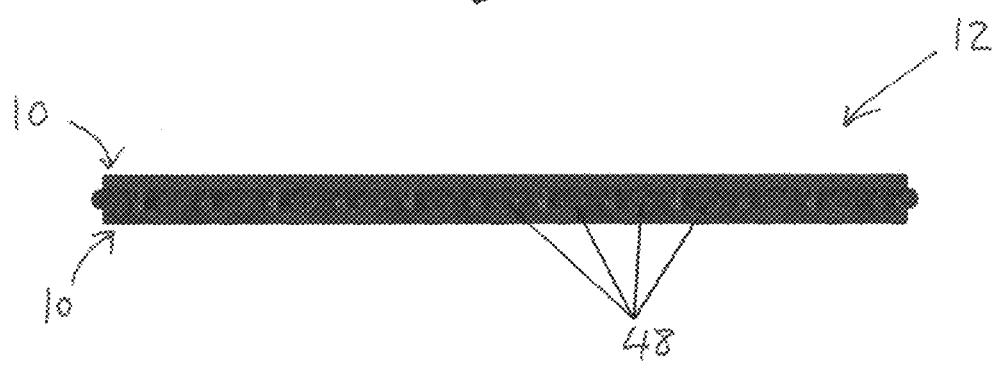
FIG. 41

CONSTRUCTION PANEL

RELATED APPLICATIONS

The application is a continuation of U.S. patent application Ser. No. 13/919,906 filed 17 Jun. 2013, now U.S. Pat. No. 9,010,060, which is a continuation-in-part of U.S. patent application Ser. No. 11/874,388 filed 18 Oct. 2007, now U.S. Pat. No. 8,464,490, which is a continuation-in-part of application Ser. No. 11/746,301 filed 9 May 2007. The disclosure of each of the previously referenced US patent applications is hereby incorporated by reference in its entirety.

TECHNICAL FIELD

This application relates to a multi-purpose construction panel.

BACKGROUND

Modular panels may be used for many different types of construction applications. For example, interlocking panels may be used to form temporary flooring, roofing or wall structures. Other potential commercial applications are described in applicant's U.S. Pat. No. 7,914,228 issued 29 Mar. 2011 entitled MULTI-PURPOSE CONSTRUCTION MODULE, which is hereby incorporated by reference in its entirety.

There is a need for light-weight, economical construction panels particularly suitable for sale directly to consumers at building supply retail outlets and the like. There is a particular need for construction panels which may be quickly and easily coupled together without the need for specialized tools or skills to form a wide variety of construction assemblies.

SUMMARY OF INVENTION

In accordance with the invention, a construction panel having a first side and a second side is provided. The first side comprises a substantially planar deck and the second side comprises a plurality of first wall elements defining a plurality of compartments therebetween and a plurality of sleeves each located in one of the compartments. The sleeves may include a first group of female sleeves having a first height and a second group of male sleeves having a second height exceeding the first height, wherein the male sleeves of one of the panels are sized to fit within the female sleeves of another one of the panels (i.e. when a pair of panels are coupled together with their respective second sides facing inwardly). The male and female sleeves may be arranged in an alternating array on the second side of each panel.

In one embodiment, at least some of the wall elements may include notches formed on an edge portion thereof. When a pair of panels are coupled together to form a construction assembly, the notches together define a conduit extending through the interior of the assembly. A fluid delivery tube may be deployed within a conduit for circulating fluid through the assembly, such as heated air or water for regulating the temperature or other physical characteristics of the assembly.

The invention comprises both single construction panels and construction assemblies formed from two or more panels.

BRIEF DESCRIPTION OF DRAWINGS

In drawings which describe embodiments of the invention but which should not be construed as restricting the spirit or scope thereof.

FIG. 3 is an exploded, isometric view of multiple bottom construction panels aligned adjacent one another and showing a single top panel.

FIG. 4 is an isometric view of the assembly of FIG. 3 showing the panels assembled together with the top panel in an overlapping orientation.

FIG. 5 is an isometric view similar to FIG. 4 showing multiple top panels.

FIG. 6 is an isometric view similar to FIG. 4 showing multiple top and bottom panels coupled together.

FIG. 7 is an exploded, isometric view similar to FIG. 3 showing the bottom panels arranged in an elongated pattern and showing a single top panel.

FIG. 8 is an isometric view of the assembly of FIG. 7 showing the panels assembled together with the top panel in longitudinal alignment with the bottom panels.

FIG. 9 is an isometric view similar to FIG. 8 showing two top panels.

FIG. 10($b$) is an isometric view of the assembly of FIG. 10($a$) showing the fluid delivery tubes in a different direction.

FIG. 11 is a plan view of a first surface of a single construction panel.

FIG. 12 is a plan view of a second surface of a construction panel.

FIG. 13($a$) is a first end elevational view of the panel.
FIG. 13($b$) is a second end elevational view of the panel.
FIG. 14($a$) is a first side elevational view of the panel.
FIG. 14($b$) is a second side end elevational view of the panel.

FIG. 20($b$) is a second side elevational view of a modified embodiment of the panel.

FIG. 21($b$) is a second end elevational view of a single panel.

FIG. 39 is an exploded isometric view of an assembly comprising two mating construction panels of FIG. 27.

FIG. 40 is an isometric view of the assembly of FIG. 39 with the construction panels coupled together.

FIG. 41 is as a side elevational view of the assembly of FIGS. 39 and 40 and showing a plurality of laterally extending fluid delivery tubes.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
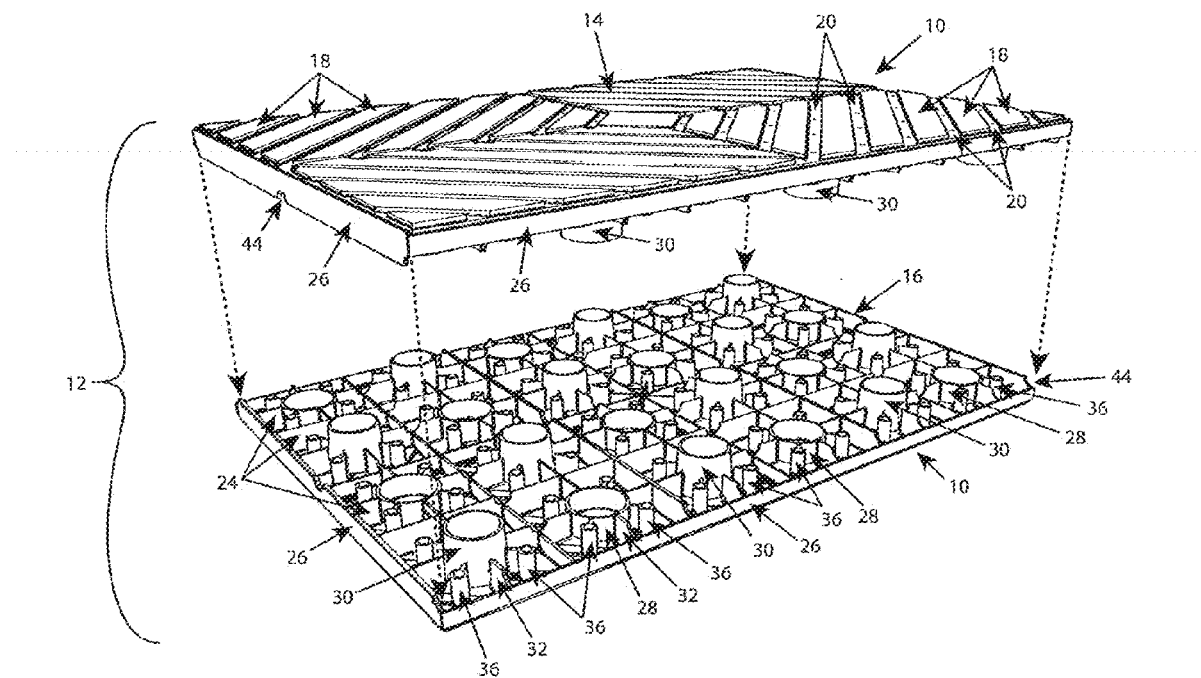
FIG. 1 is an exploded, isometric view of two mating construction panels configured in accordance with the invention.
Figure 2:
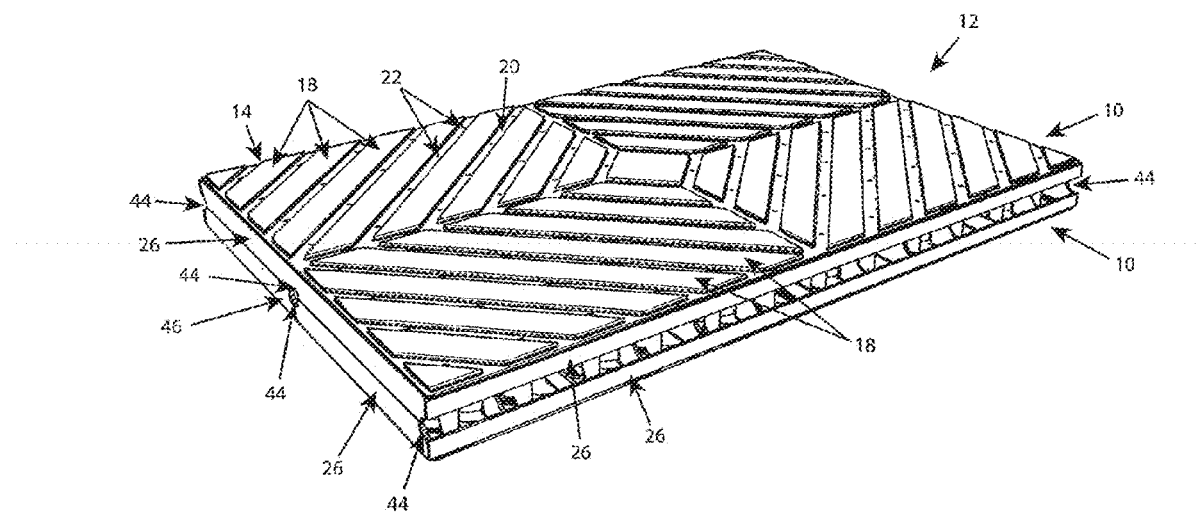
FIG. 2 is an isometric view of the construction panels of FIG. 1 in an assembled configuration.

This application relates to a multi-purpose construction panel 10. In the illustrated embodiment panel 10 is generally rectangular in shape. As shown in FIGS. 1 and 2, each panel 10 may be matingly engaged with another panel 10 to form an assembly 12. As shown in FIGS. 3-9, and as described in further detail below, a plurality of panels 10 may be aligned in a desired configuration and releasably coupled together to form assemblies 12 of different sizes and shapes.

Figure 18:
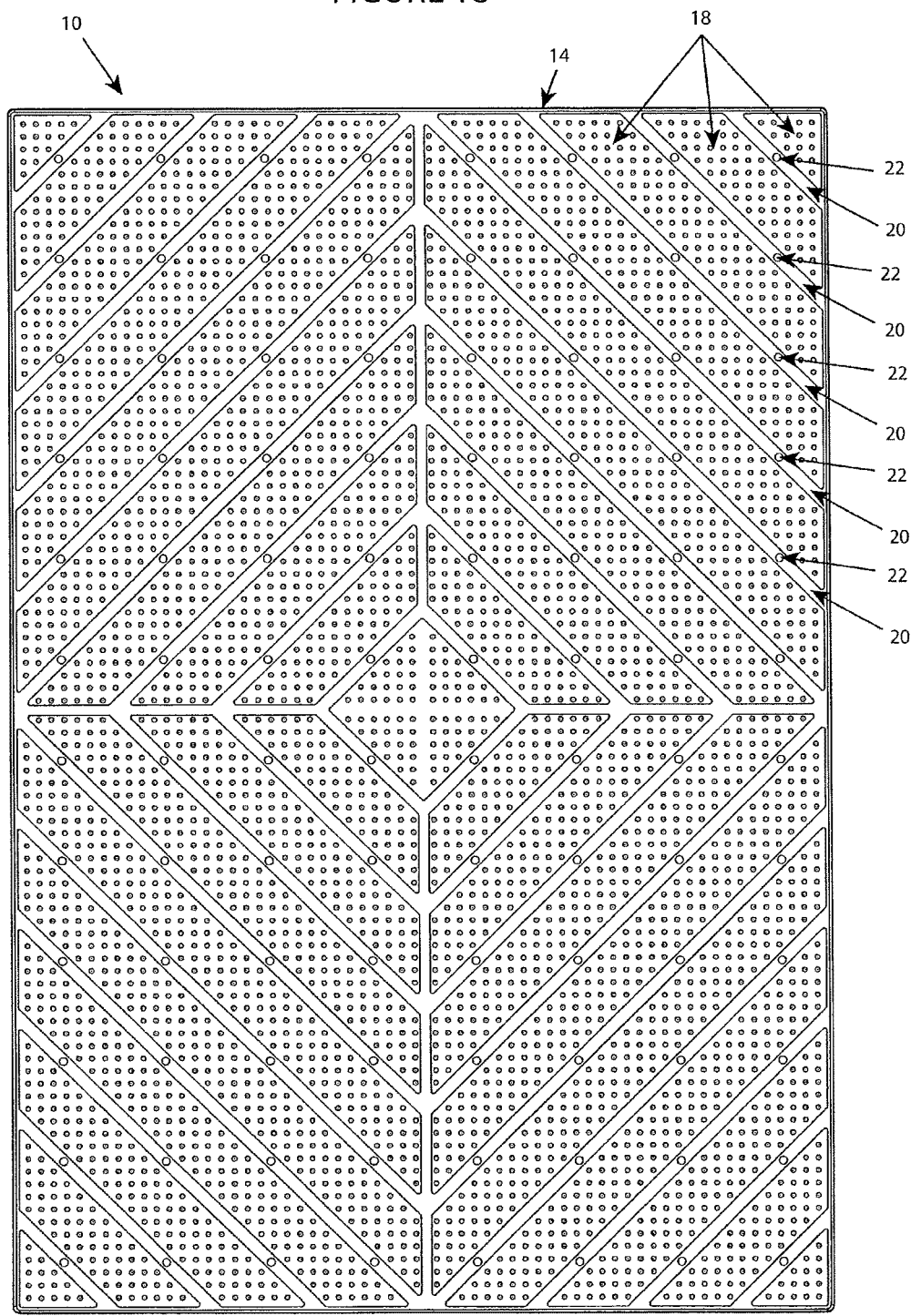
FIG. 18 is an enlarged, top plan view of the first surface of the panel similar to FIG. 11.

Each panel 10 has a first side 14 and a second side 16. As shown in FIGS. 11 and 18, for example, first side 14 may comprise a planar deck surface 18 interrupted by a plurality of channels 20. Optionally, a plurality of small apertures 22, which extend between sides 14, 16, may be spaced within channels 20. The orientation of the channels 20 may be arranged to form a decorative pattern on first side 14. For example, channels 20 may subdivide deck surface 18 into a plurality of quadrilateral or triangular shaped deck segments. In alternative embodiments, side 14 may consist of a flat continuous sheet or other shapes or patterns could be substituted.

Figure 17:
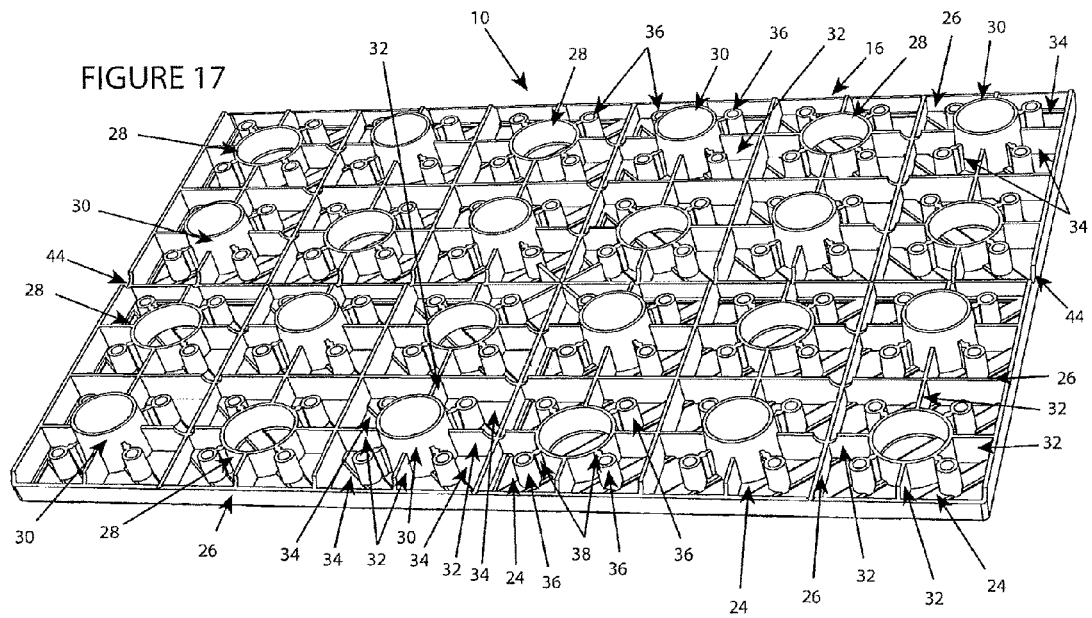
FIG. 17 is an isometric view showing the second surface of a single construction panel.
Figure 19:
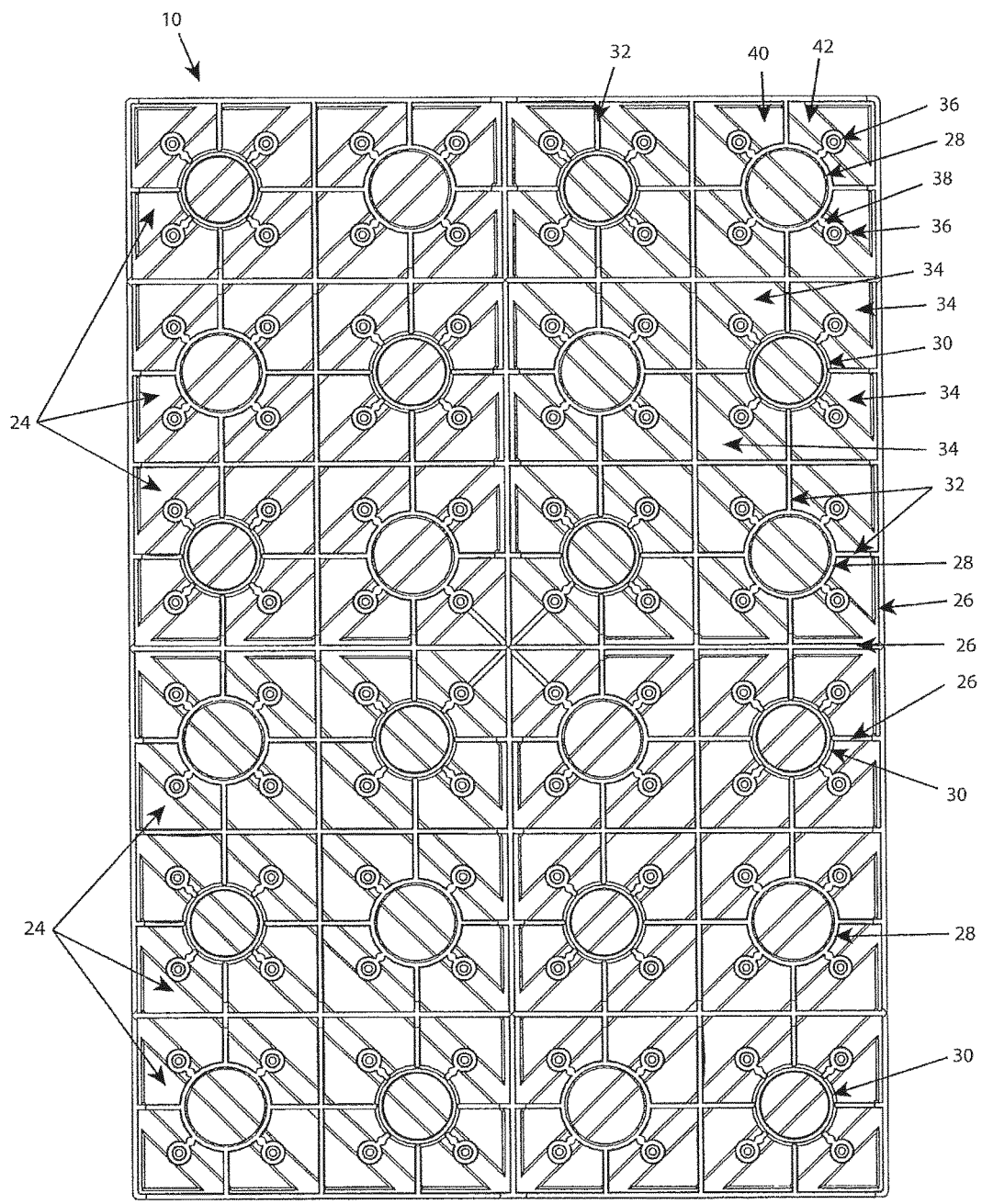
FIG. 19 is an enlarged, top plan view of a second surface of the panel similar to FIG. 12.
Figure 20:
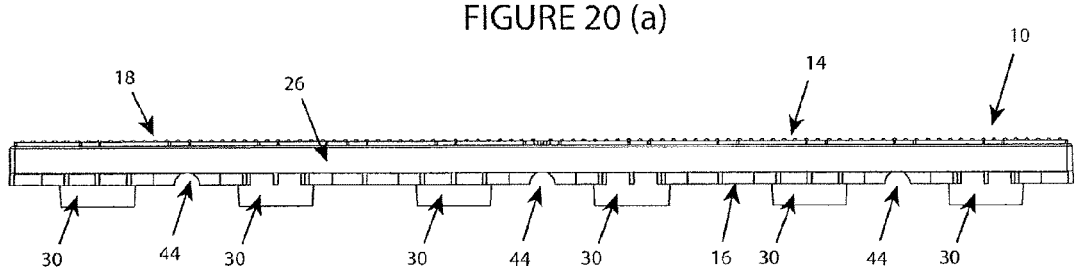
FIG. 20($a$) is a first side elevational view of a single panel.
Figure 20:
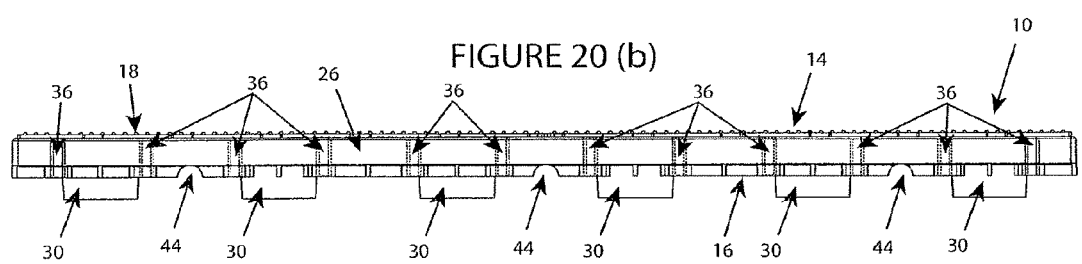
Figure 21:
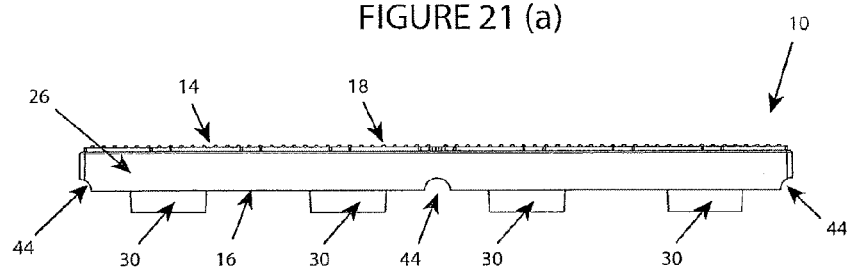
FIG. 21($a$) is a first end elevational view of single panel.
Figure 21:
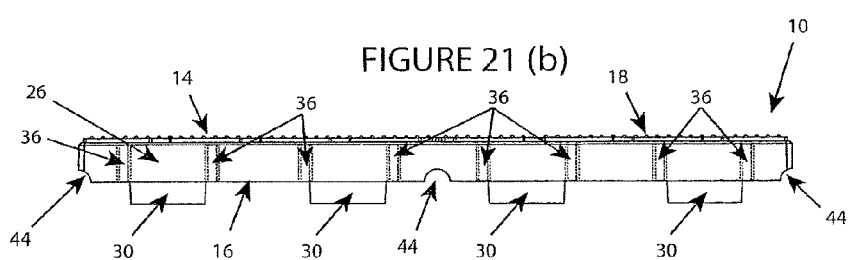
Figure 22:
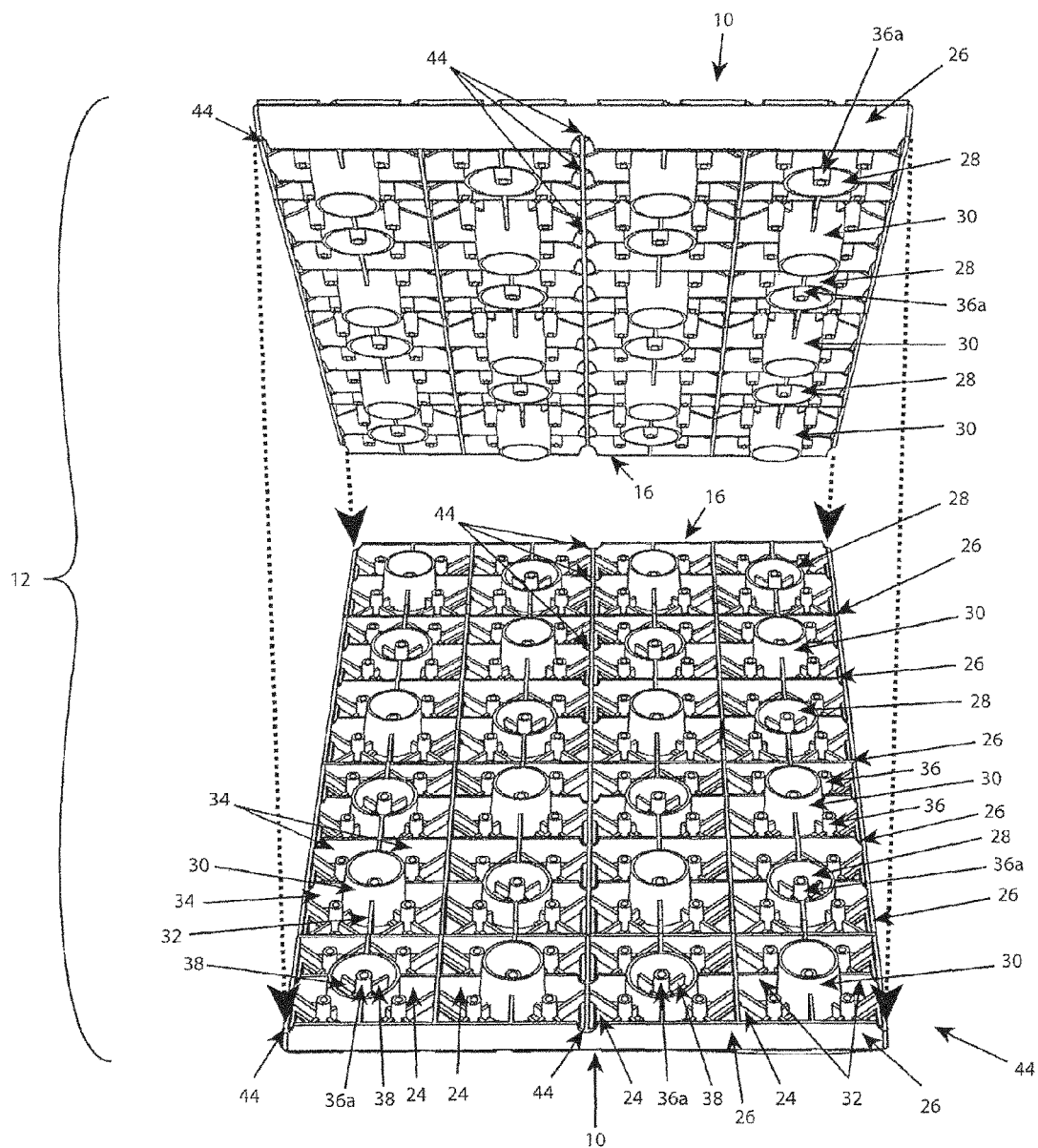
FIG. 22 is an exploded, end isometric view of two mating construction panels configured in accordance with an alternative embodiment the invention.
Figure 23:
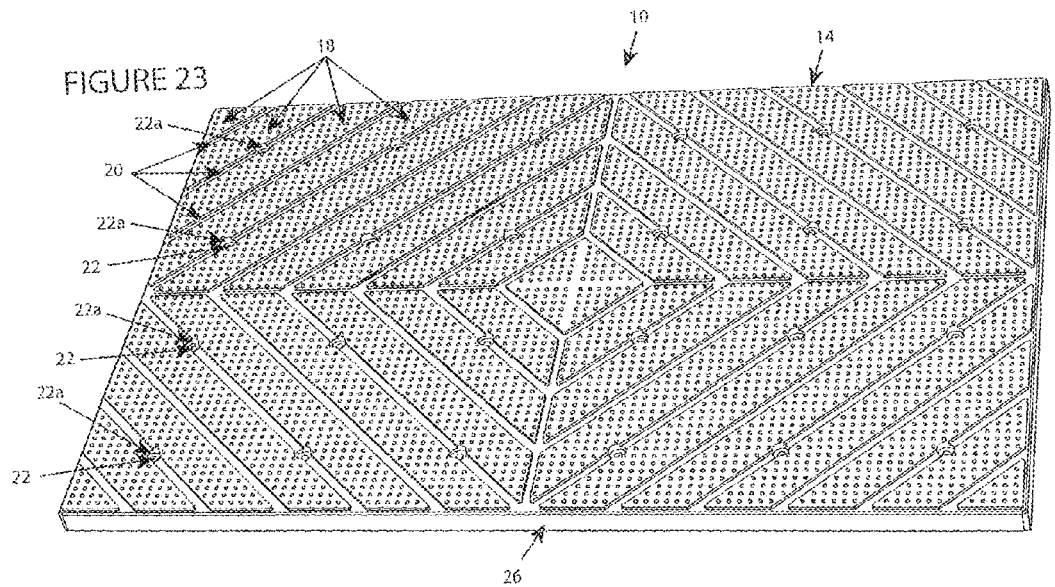
FIG. 23 is an isometric view showing the first surface of a single construction panel of FIG. 22.

Panel second side 16 is subdivided into a plurality of compartments 24 by wall partitions 26, as shown in FIGS. 12, 17 and 19 for example. In the illustrated embodiments, compartments 24 are square or rectangular in shape. A plurality of cylindrical female sleeves 28 and male sleeves 30 are disposed within compartments 24. In the illustrated embodiment male sleeves 30 have a smaller diameter and larger height than female sleeves 28. More particularly, sleeves 30 project from compartments 24 to a greater extent than sleeves 28. When a pair of panels 10 are coupled together as shown in FIG. 2, the second sides of the respective panels 10 matingly engage such that each male sleeve 30 on one panel 10 is received within a corresponding female sleeve 28 on the other panel 10, and vice versa.

As best shown in FIGS. 12, 17 and 19, each compartment 24 may be further subdivided by wall partitions 32 into subcompartments 34. In the illustrated embodiment each compartment 24 is divided into 4 subcompartments 34. Each wall partition 32 is connected to and structurally supports a sleeve 28, 30. A small cylindrical guide tube 36 may be disposed within each subcompartment 34. Each tube 36 may be connected to a corresponding sleeve 28, 30 by means of a flange 38. As described further below, tubes 36 may function as guides for receiving fasteners used to couple mating panels 10 together. As described below, the fasteners (not shown), are insertable into tubes 36 through apertures 22 which are aligned therewith.

The bottom or innermost surface 40 of panel second side 16 is generally flat. However, as best shown in FIGS. 17 and 19, surface 40 may comprise elongated ribs 42 which define the channels 20 of panel first side 14, as described above.

Figure 10:
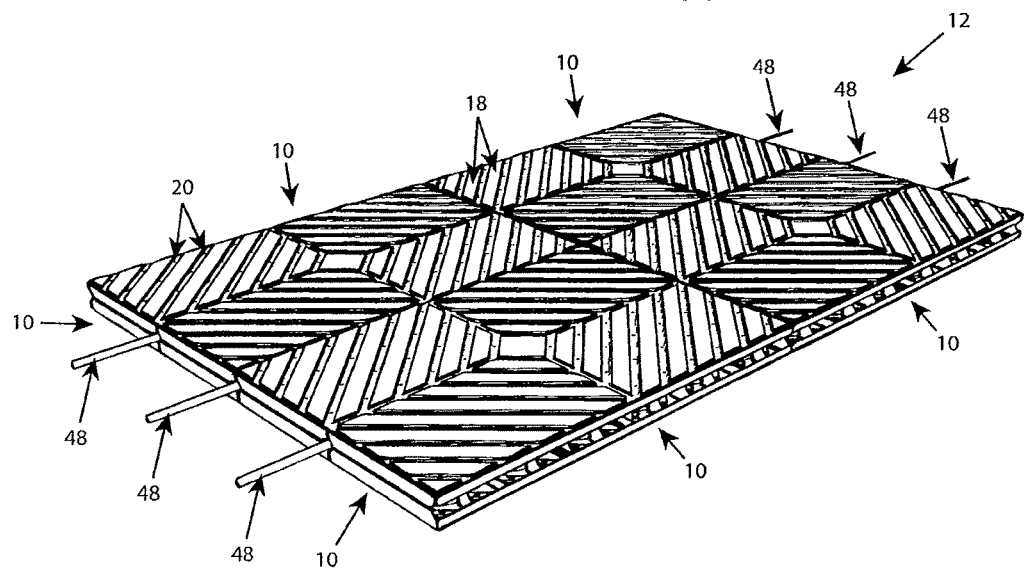
FIG. 10($a$) is an isometric view of an assembly comprising multiple construction panels coupled together and showing fluid delivery tubes extending through conduits defined within the interior of the assembly.
Figure 10:
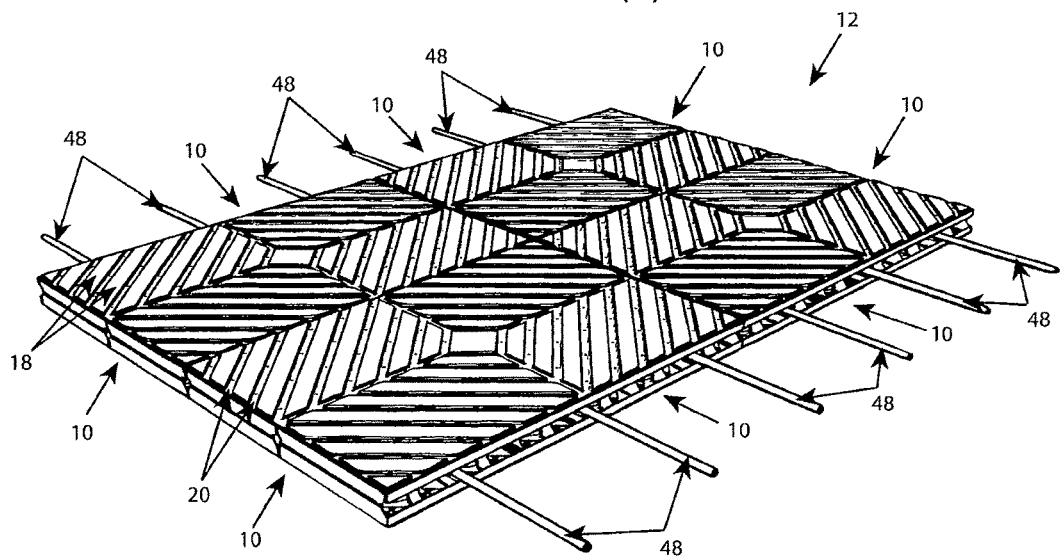
Figure 15:
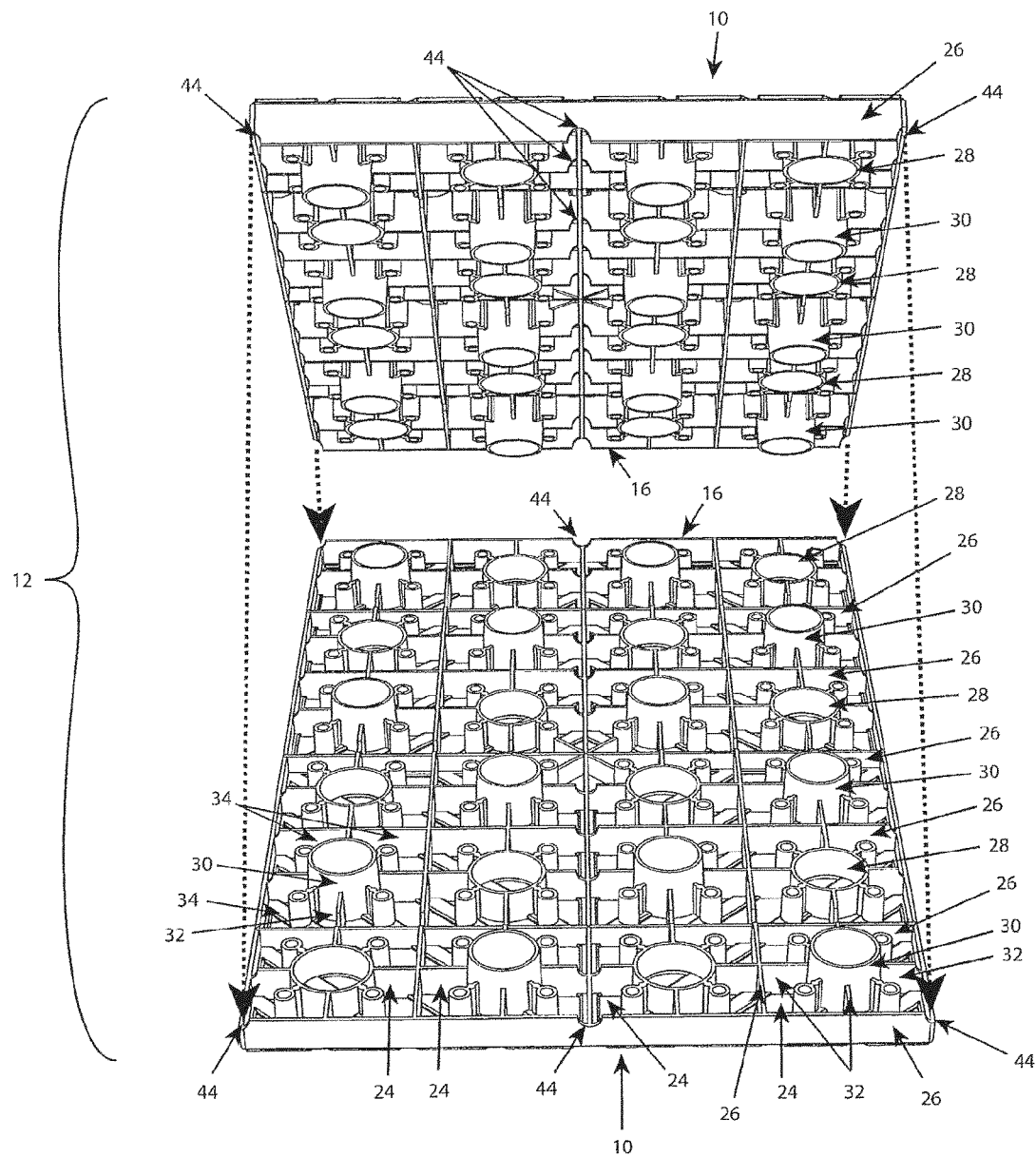
FIG. 15 is an exploded, end isometric view of two mating construction panels configured in accordance with the invention.
Figure 16:
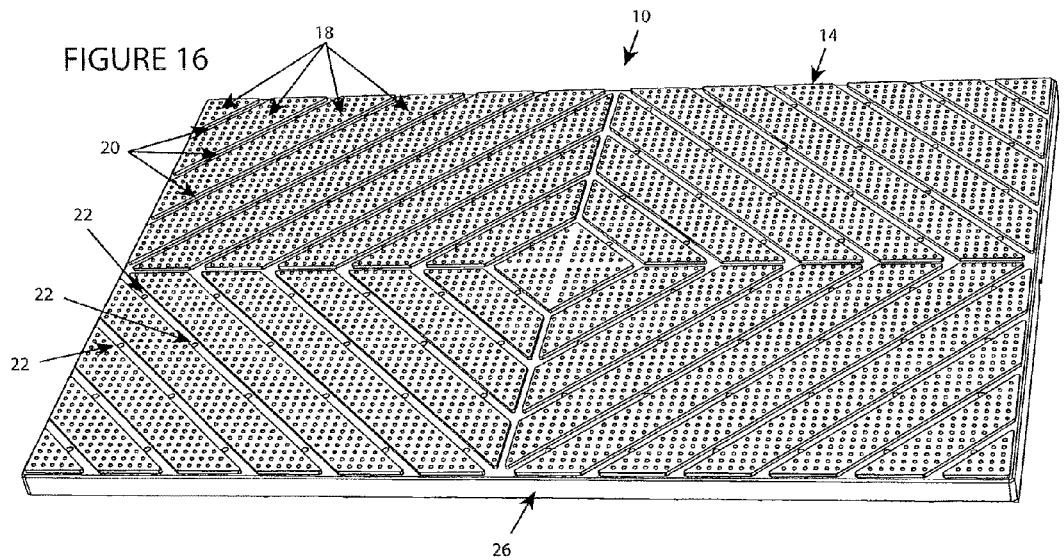
FIG. 16 is an isometric view showing the first surface of a single construction panel.

As shown, for example, in FIG. 15, some wall partitions 26 and 32 comprise linearly aligned notches 44 formed in edge portions thereof. In the illustrated embodiment, each notch 44 has a semi-circular or quarter-circular profile. As shown best in the end elevational views of FIGS. 13(a), (b) and 21(a), (b), wall partitions 26 and 32 having notches 44 with a quarter-circular profile may be located at the edges of panel 10 (i.e. where a panel 10 may be arranged to abut another panel 10). When a mating pair of panels 10 are coupled together to form an assembly 12 with the second side 16 of each panel facing inwardly, the notches 44 of each panel 10 are aligned and together define a cylindrical conduit 46 extending through the interior of assembly 12 (FIG. 2). Likewise, when four or more panels 10 are grouped together to form larger structures, conduits 46 may be defined at the joinder between adjacent pairs of assemblies (FIGS. 10(a) and 10(b)). As shown in FIG. 10(a), each conduit 46 may receive a fluid delivery tube 48, for example for circulating anti-freeze, heated air or other fluid through each assembly 12. Other filaments may also be disposed in conduits 46, such as cables for use in securing a large number of assemblies 12 together. Optionally, as shown in FIG. 10(b), tubes 48 or other filaments may be deployed in each assembly 12 in a transverse rather than longitudinal direction (that is, tubes 48 may extend in a direction perpendicular to the direction shown in FIG. 10(a)).

A plurality of construction panels 10 may be conveniently coupled together to form assemblies 12 having many different possible shapes and sizes. As shown in FIGS. 3-9, multiple panels 10 forming a base portion may first be aligned adjacent one another, each with their first side 14 facing downwardly on a support surface and their second side 16 facing upwardly. A plurality of mating panels 10 forming a top portion, each with their second side facing downwardly and their first side facing upwardly, may then be placed on the aligned base panels 10. As shown in FIGS. 3-6, each top panel 10 may be positioned so that it overlaps multiple base panels 10 to bind the base panels 10 together. Alternatively, each top panel 10 may be positioned so that it is aligned with only a single corresponding base panel 10, as shown in FIGS. 2, 10(a), 10(b) and 15.

As will be appreciated by a person skilled in the art, although the terms "base" and "top" have been used in the example above, assembly 12 may be configured in many different orientations. For example, since each panel 10 of assembly 12 is identical in this embodiment, and hence assembly 12 is symmetrical, assembly 12 may be flipped 180 degrees so that the "top" panels form part of the base and vice versa. Further, assemblies 12 may be oriented vertically, for example as part of a wall structure, or in other non-horizontal orientations.

Once panels 10 have been assembled as desired to form assembly 12, panels 10 may be secured together with fasteners. For example, bolts (not shown) may be inserted through selected apertures 22 on one side of assembly 12 and into tubes 36. Once they are fully inserted, bolts may be secured, such as with nuts, on the opposite side of assembly 12.

In some applications it may be desirable that assembly 12 be fluid-impervious. For example, in chemical warehouses and the like it may be important that flooring be impervious to fluid chemicals to prevent soil and groundwater contamination. In such applications, grooves 20 on panel first surfaces 14 may be filled with caulking or other sealants after panels 10 have been fastened together. In other embodiments, panels 10 may be manufactured with no apertures 22 or with only a small number of apertures 22 necessary to secure panels 10 together. This would avoid the need to seal unfilled apertures 22.

In other applications, it may be important that a large number of apertures 22 remain open after assembly 12 is assembled and deployed. For example, assembly 12 may be used in applications, such as temporary walkways, where it is desirable to avoid collection of water on the surface thereof. In such applications water can be collected within channels 20 and drain through tubes 36 into the ground or other support surface underlying assembly 12. Apertures 22 also enable any water or water vapour within the interior of assembly 12 to escape to the surrounding environment. This may be important in northern climates having frequent freeze/thaw weather cycles.

Construction panels 10 may be formed from molded plastic or other light-weight materials in one embodiment of the invention. By way of non-limiting example, each panel 10 may be 32"×48" in size have a thickness of approximately 2". In this example, each compartment 24 is approximately 8"×8" in size and each longitudinally extending conduit 46 (FIG. 10(a)) is approximately 16" apart. A plastic panel 10 having the above dimensions weighs on the order of about 20 pounds and may therefore be easily lifted and carried by a single person for ease of installation. This enables convenient assembly or disassembly of panels 10 by ordinary consumers without the need for cranes or other heavy lifting machinery.

Construction panels 10 may be used to form assemblies 12 useful in a wide variety of applications. For example, assemblies 12 may be used in flooring, roofing and wall construction applications in both indoor and outdoor environments. By way of non-limiting examples, assemblies 12 may be used in walkways, roadways, parking lots, driveways, decking and roofing. In some applications, assemblies 12 may be mounted on top of existing structures, such as decking joists or beams, or may be covered by other materials, such as roofing materials. Since panels 10 are lightweight and easy to handle, and relatively inexpensive to manufacture and transport, they will be useful in many consumer applications. Other potential consumer and industrial applications for construction panels and the like are described in the applicant's U.S. Pat. No. 7,914,228 issued 29 Mar. 2011 entitled MULTI-PURPOSE CONSTRUCTION MODULE which is hereby incorporated by reference in its entirety.

As described above, assemblies 12 may be deployed in applications where it is desirable to regulate the temperature or other physical characteristics thereof. For example, heated assemblies 12 may be used as temporary driveway covers in winter months to prevent snow and ice accumulation. The temperature of assemblies 12 may be regulated by circulating fluids in a flow path through the interior of each assembly 12. For example, as shown schematically in FIG. 10, in one embodiment of the invention a heat-regulating or heat exchanging fluid may be circulated through tubing 48 deployed within conduits 46. As used in this patent application, the term "fluids" includes both liquids and gases. For example, the fluid may be water heated by a boiler (not shown) in fluid communication with tubing 48. In another embodiment of the invention, the fluid may be anti-freeze. In yet another embodiment, gases could be circulated within conduits 46, such as heated air. The boiler may include a fluid pump or, alternatively, a pump may be installed at another location in the flow path As is well known in the prior art, the fluid pump may include a timer or other controller to operate only during selected intervals rather than continuously.

By way of further example, assemblies 12 may be connected to form panels suitable for use as heated flooring, roofing or wall panels. For example, heated flooring, walls or roofing comprising construction panels 10 could be used in barns, stables, greenhouses, storage sheds or other temporary structures where it is important to control indoor temperature or avoid snowfall or ice accumulation. As indicated above, other materials could be placed over assemblies 12 such as dirt, mulch, bedding, rubber matting, styrofoam or other roofing materials, depending upon the particular application.

As indicated above, assemblies 12 could be temporarily installed in outdoor parking lots, driveways, roadways and the like to melt snow during winter months in northern climates. Assemblies 12 could similarly used on roofing to reduce or prevent snow accumulation. Assemblies 12 could be configured so that they are heated only during particular climatic conditions or during particular times of day. At the end of the winter season the panels 12 could be quickly and easily disassembled and removed if desired.

Depending upon the application and range of operating temperatures, the distance between conduits 46 could be adjusted. For example, in very cold conditions the number of conduits 46 carrying heated water in tubes 48 could be increased to reduce the distance between adjacent conduits and ensure that the entire assembly 12 is evenly heated. As will be appreciated by a person skilled in the art, in alternative embodiments of the invention the flow path of conduits 48 could also be varied (e.g. by using non-linear flow paths) to achieve substantially even heating or to suit particular applications.

As will be appreciated by a person skilled in the art, construction panels 10 may be formed in many different shapes and sizes. For example, in addition to rectangular shapes, panels 10 could be constructed in hexagonal, pentagonal or other geometric shapes or combinations thereof.

A further embodiment of the invention is in FIGS. 22-26. In this embodiment a tube 36a may be located in each sleeve 28 and 30. As described above, panels 10 may be coupled together to form an assembly 12 with each male sleeve 30 inserted into a corresponding female sleeve 28. Panels 10 may then be secured together with fasteners such as bolts inserted through selected apertures 22 on one side of assembly 12 and into tubes 36a (instead of, or in addition to, tubes 36). Once they are fully inserted, bolts may be secured, such as with nuts, on the opposite side of assembly 12. Each panel may also include notches 22a surrounding an aperture 22 on first side 14 to accommodate a bolt 5 head, nut or washer. This ensures that end portions of the fastener will be flush or recessed relative to deck 18.

In the embodiment of FIGS. 22-26 additional flanges 38 may be provided for structurally supporting tubes 36 and 36a. For example, as shown best in FIG. 26, each tube 36, 36a may be supported by four separate flanges 38.

Figure 30:
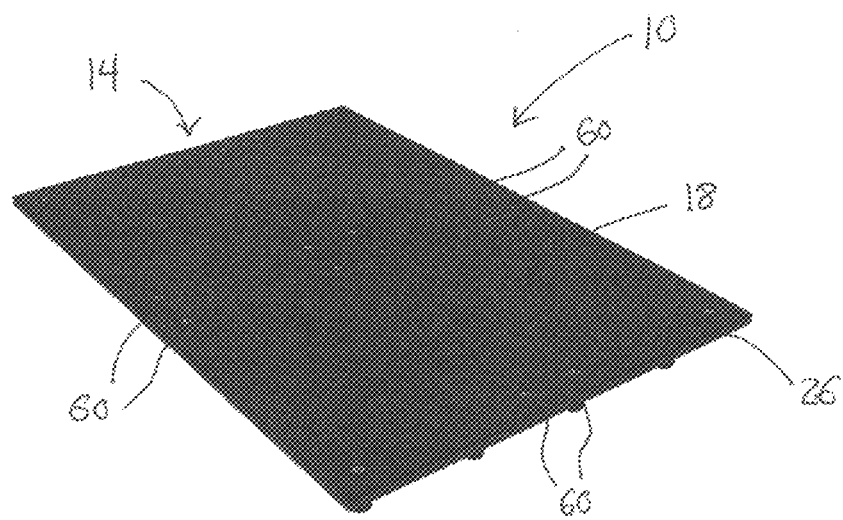
FIG. 30 is an isometric view showing the first side of the panel of FIG. 27.

A further embodiment of the invention is shown in FIGS. 27-50. As in other embodiments, panel 10 is generally rectangular in shape and has a first side 14 and a second side 16. As in other embodiments, first side 14 may comprise a generally planar deck surface 18 (FIG. 30). As shown for example in FIGS. 27, 27A, 33 and 35, second side 16 includes a plurality of compartments 24 defined by wall partitions 26 which project from a flat bottom or innermost surface 40. The outermost wall partitions 26 form the side and endwalls at the perimeter of panel 10. As shown best in FIG. 35, sleeves 28, 30 and partitions 32 may have radiused corners 50 where they are connected to surface 40.

Figure 35:
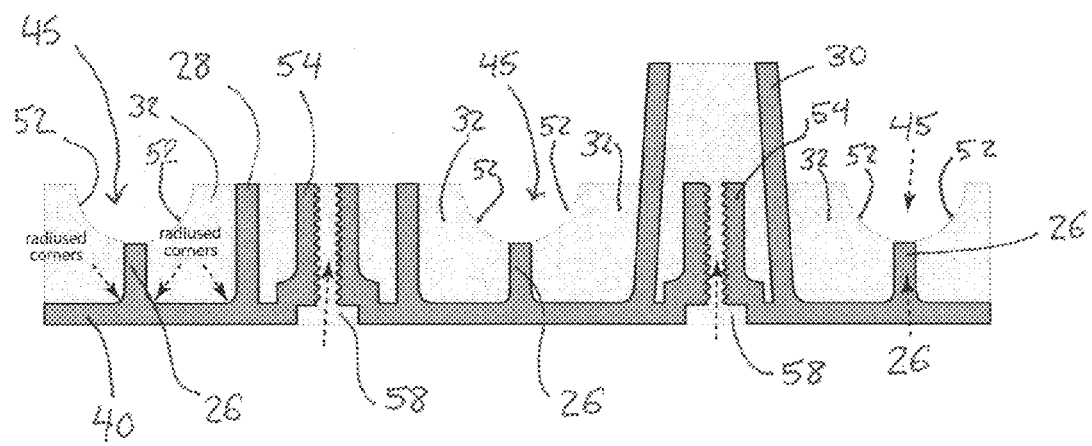
FIG. 35 is an enlarged, side view of a portion of the panel of FIG. 33 showing adjacent male and female sleeves, each of the sleeves having threaded bolt posts.

In the illustrated embodiments, compartments 24 are square or rectangular in shape. A plurality of cylindrical female sleeves 28 and male sleeves 30 are disposed within compartments 24 in an alternating array and project from surface 40. As in other embodiments, male sleeves 30 have a smaller diameter and larger height than female sleeves 28. In some embodiments male sleeves 30 may be tapered, as best shown in FIG. 35. When a pair of panels 10 are coupled together to form an assembly 12, as shown for example in FIG. 31, the second sides of the respective panels 10 matingly engage such that each male sleeve 30 on one panel 10 is received within a corresponding female sleeve 28 on the other panel 10, and vice versa.

Figure 31:
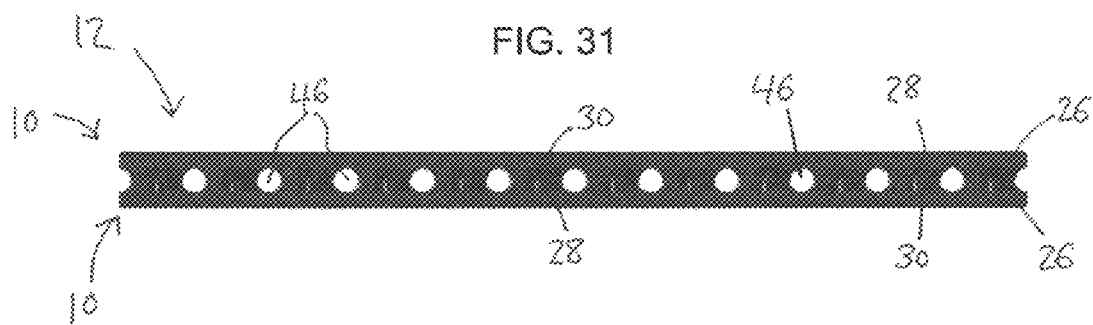
FIG. 31 is a side elevational view of an assembly comprising two mating construction panels of FIG. 27.
Figure 32:
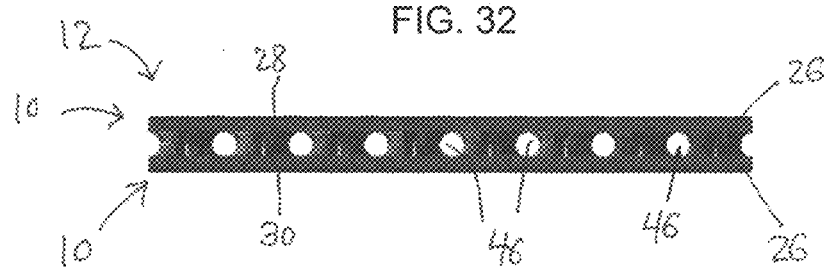
FIG. 32 is an end elevational view of the assembly of FIG. 31.
Figure 33:
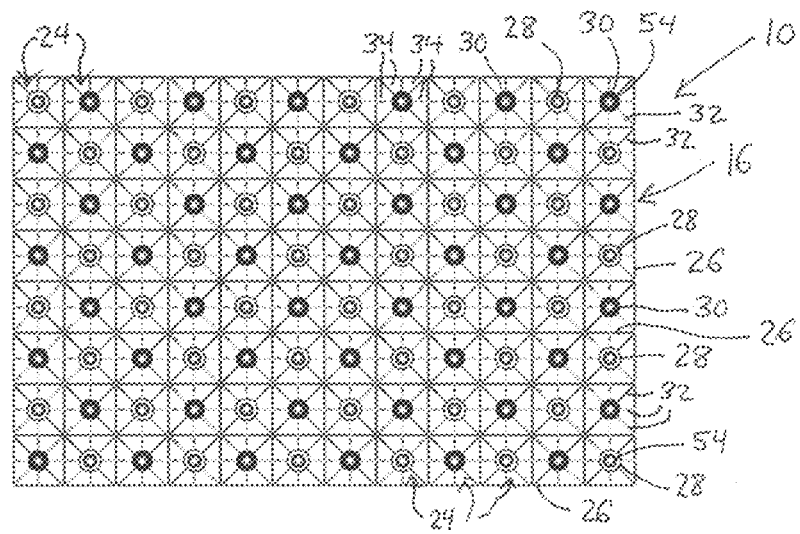
FIG. 33 is a top plan view of the second side of the panel of FIG. 27 showing the arrangement of alternating male and female sleeves.
Figure 34:
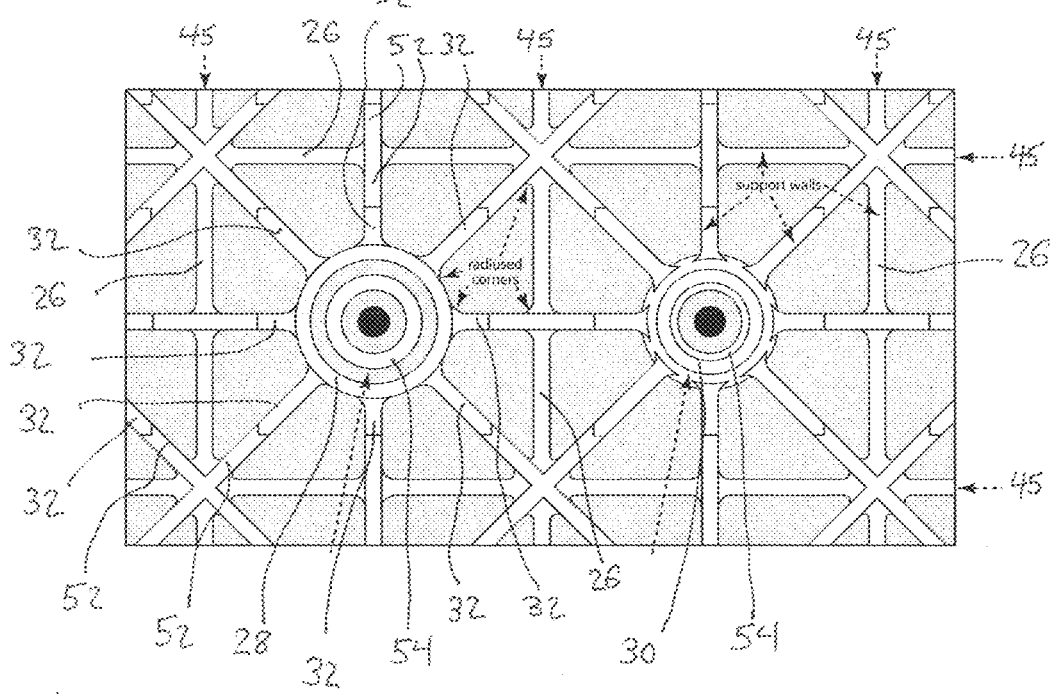
FIG. 34 is an enlarged, top plan view of a portion of the panel of FIG. 33 showing adjacent male and female sleeves.

As in other embodiments, each compartment 24 may be further subdivided by wall partitions 32 into subcompartments 34 (FIG. 33). Each wall partition 32 structurally supports a sleeve 28, 30 and includes a radiused portion 52 distal from the sleeve 28, 30 adjacent a wall partition 26. In the illustrated embodiment, wall partitions 32 may extend longitudinally, laterally and/or diagonally to provide structural support for sleeves 28, 30 disposed within compartments 24. As will be apparent to a person skilled in the art, other configurations of wall partitions 26 and 32 are possible. As shown best in FIGS. 27 and 35, adjacent radiused portions 52 of partitions 32 together define channels 45 having a semi-circular profile extending above wall partitions 26 in both longitudinal and lateral (i.e. transverse) directions. When a pair of panels 10 are coupled together to form an assembly 12, channels 45 from mating panels 10 are aligned to together form cylindrical conduits 46 extending through the interior of the assembly 12 (FIGS. 31-32). Since conduits 46 extend above each wall partition 26 in this embodiment, the total number of conduits 46 is greater than in the embodiments of FIGS. 10(a) and 10(b).

Figure 36:
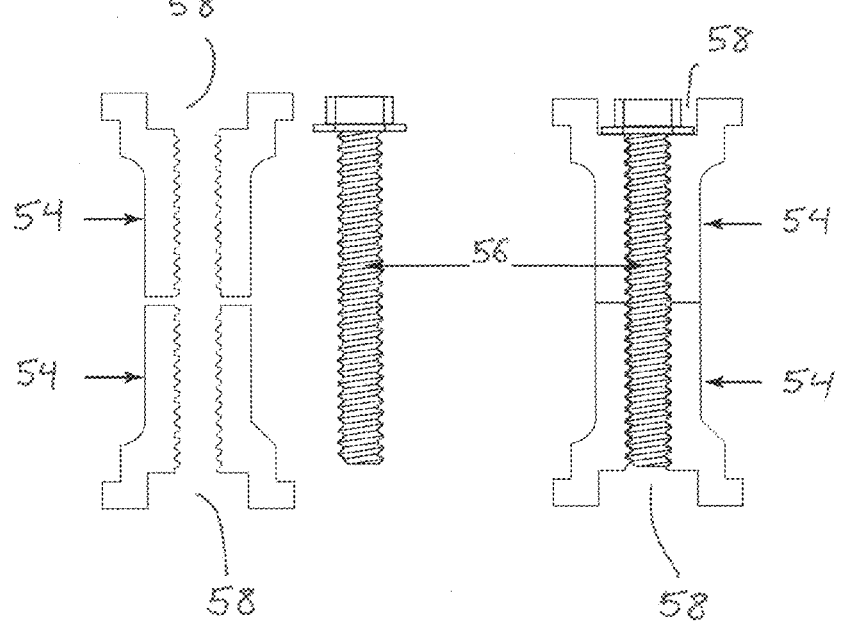
FIG. 36 is an enlarged, side elevational view showing pairs of threaded bolt posts aligned on mating panels and a bolt for coupling the bolt posts together.
Figure 37:
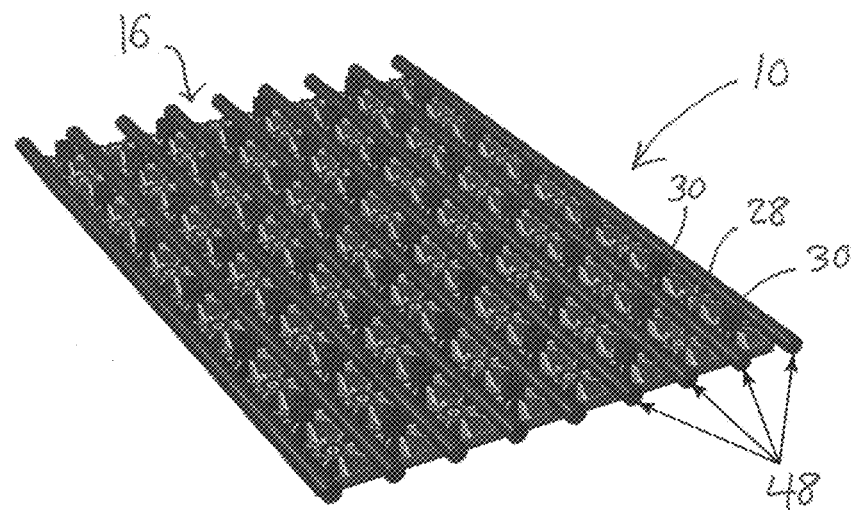
FIG. 37 is an isometric view of the panel of FIG. 27 with a plurality of fluid delivery tubes extending longitudinally in conduit channels.
Figure 38:
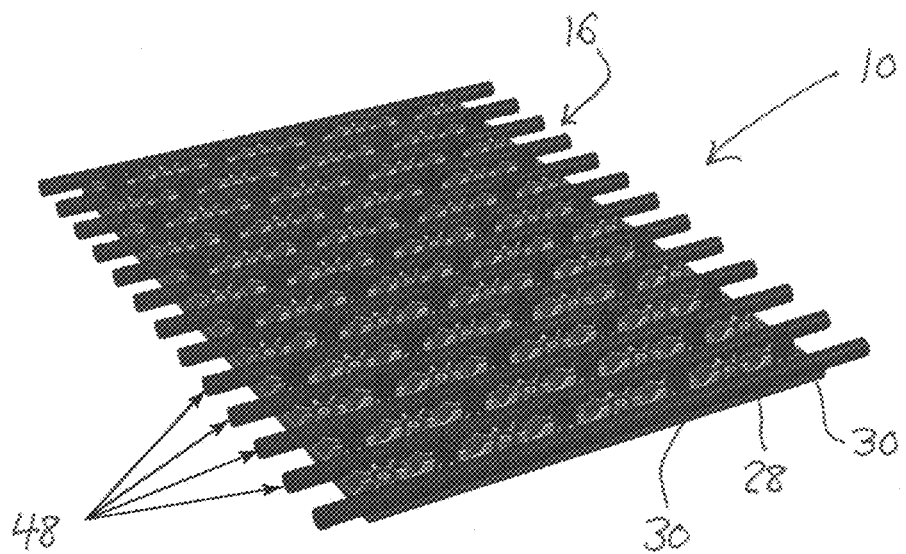
FIG. 38 is an isometric view of the panel of FIG. 27 with a plurality of fluid delivery tubes extending laterally in conduit channels.
Figure 42:
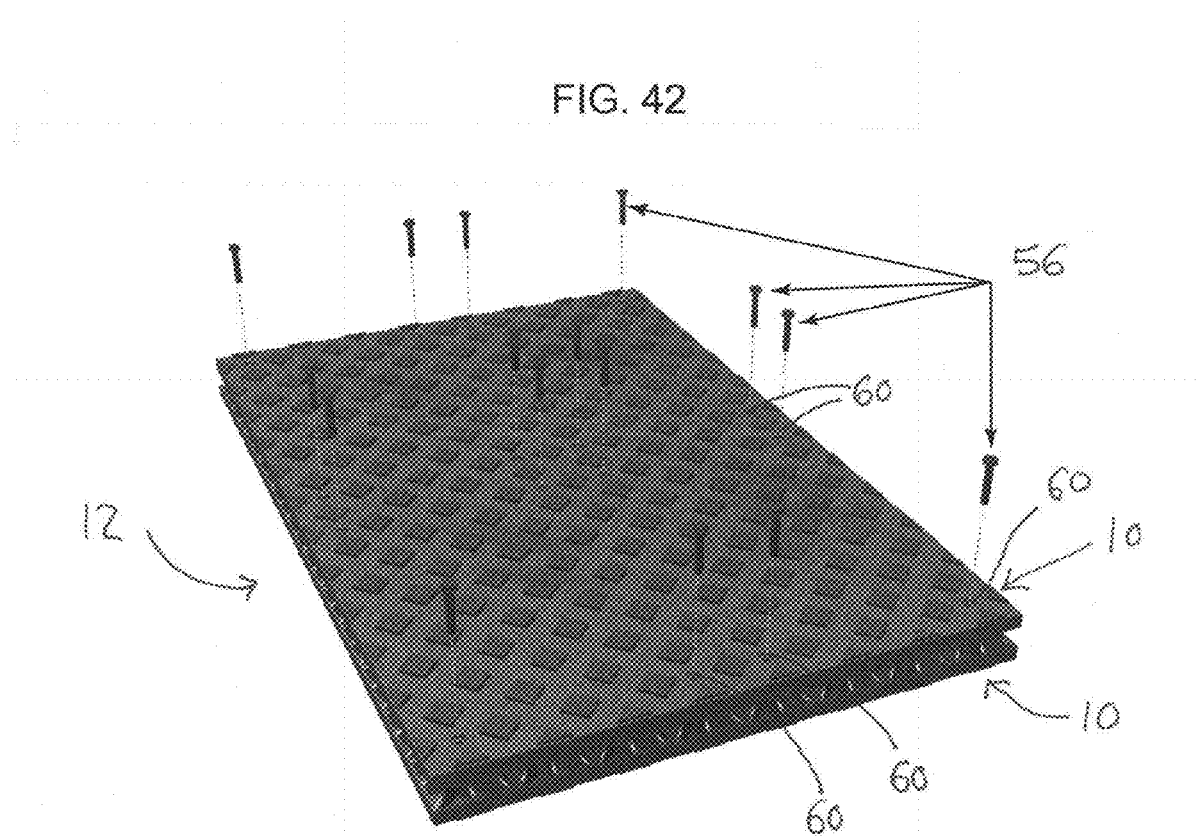
FIG. 42 is an isometric view of the assembly of FIG. 40 showing a plurality of bolts insertable into mating bolt posts for coupling the construction panels together.
Figure 43:
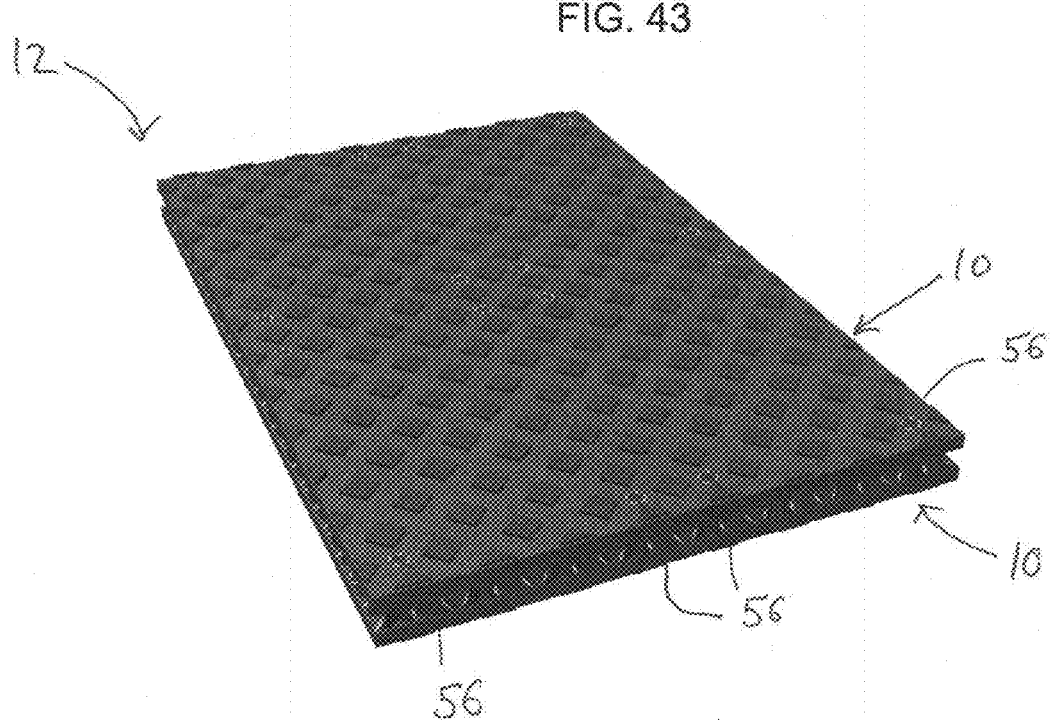
FIG. 43 is an isometric view of the assembly of FIG. 42 with the bolts fully inserted.

In the embodiment of FIGS. 27-50 an internally threaded bolt post 54 is positioned within some or all of sleeves 28, 30. As shown best in FIGS. 36, 42 and 43, when a pair of panels 10 is coupled together to form an assembly 12 the threaded bolt posts 54 disposed within mating sleeves 28, 30 are aligned. Bolts 56 can be inserted into the threaded bolt posts 54 from either direction to securely couple panels 10 together. Each bolt post 54 includes a countersunk end portion 58 to accommodate the end of the bolt (FIG. 36). As shown in FIGS. 42 and 43, in one embodiment bolts 56 may be inserted at selected locations on assembly 12 rather than in each sleeve 28, 30. Apertures 60 may extend between sides 14, 16 at selected locations to receive bolts 56 (FIG. 42).

In an alternative embodiment of the invention bolt posts 54 may not be internally threaded. In this case bolts 56 or other fasteners may be inserted through bolt posts 54 and held in place with a nut, similar to the embodiment described above where fasteners are insertable into tubes 36 and/or 36a.

Figure 44:
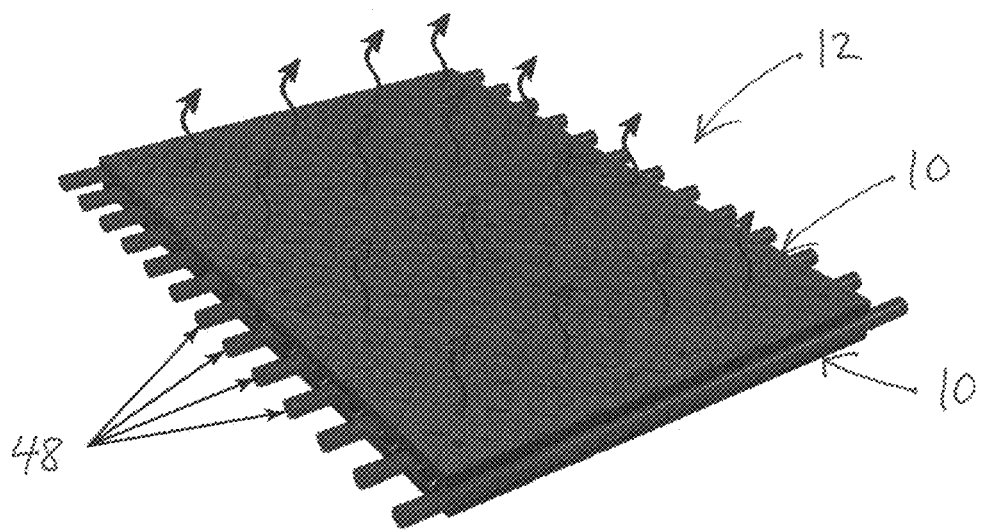
FIG. 44 is an isometric view of the assembly of FIG. 40 showing a plurality of laterally extending fluid delivery tubes.
Figure 45:
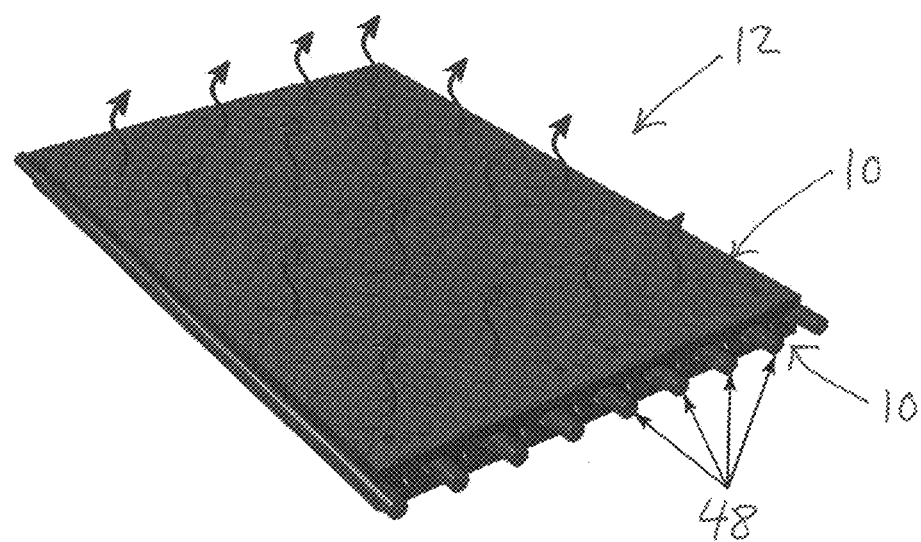
FIG. 45 is an isometric view of the assembly of FIG. 40 with longitudinally extending fluid delivery tubes.
Figure 46:
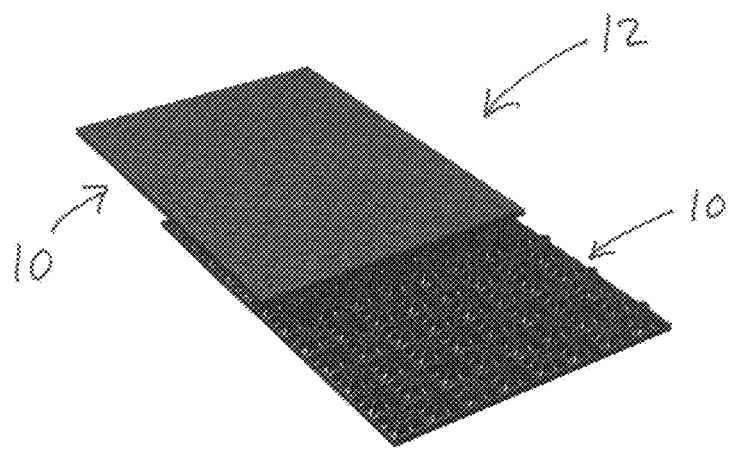
FIG. 46 is an isometric view of an assembly comprising two mating construction panels overlapping by half lengthwise.
Figure 47:
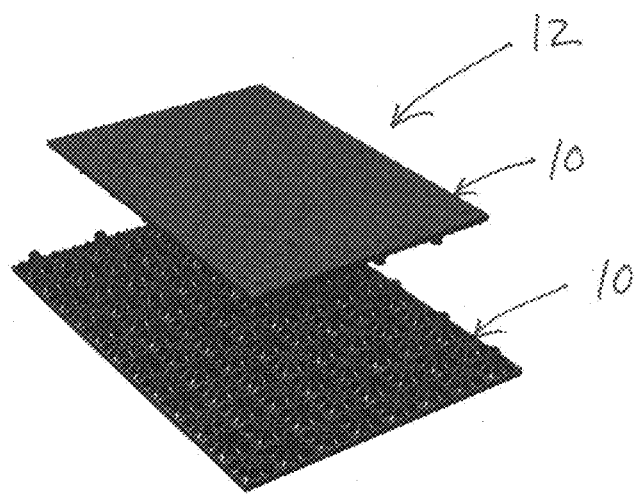
FIG. 47 is a view of an assembly comprising two mating construction panels overlapping diagonally by quarters.
Figure 48:
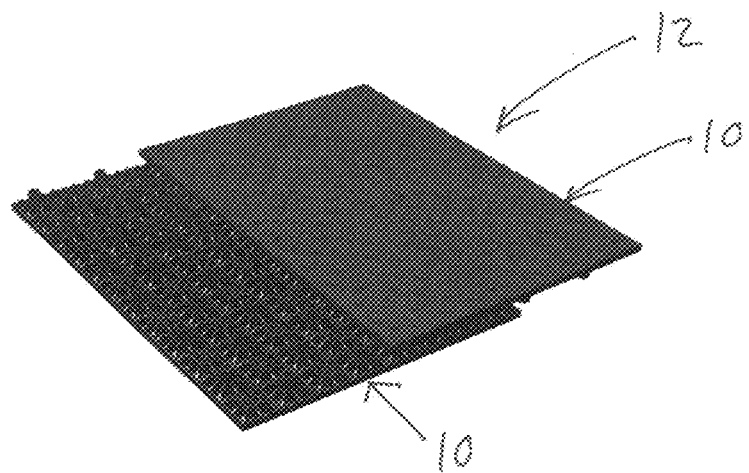
FIG. 48 is an isometric view of an assembly comprising two mating construction panels overlapping by half sidewise.

As in other embodiments, conduits 46 are provided for receiving fluid delivery tubes 48. As explained above, fluid delivery tubes may be used, for example, for circulating anti-freeze, heated air, heated liquid or other fluids through assembly 12. FIG. 41 shows a side elevational view of an assembly 12 with fluid delivery tubes 48 installed within conduits 46. FIGS. 44 and 45 illustrate an assembly with fluid delivery tubes 48 configured as either laterally extending or longitudinally extending radiant heat sources. Since there are a greater number of conduits 46 in the embodiment of FIGS. 27-50, this enables an increased density of fluid delivery tubes 48 in comparison to other embodiments, resulting in enhanced heat or cold distribution in radiant heat installations. In use, fluid delivery tubes 48 would typically be installed on a lower panel 10 in channels 45 before an upper panel 10 was aligned and coupled to the lower panel 10 and bolted in place as described above.

Figure 24:
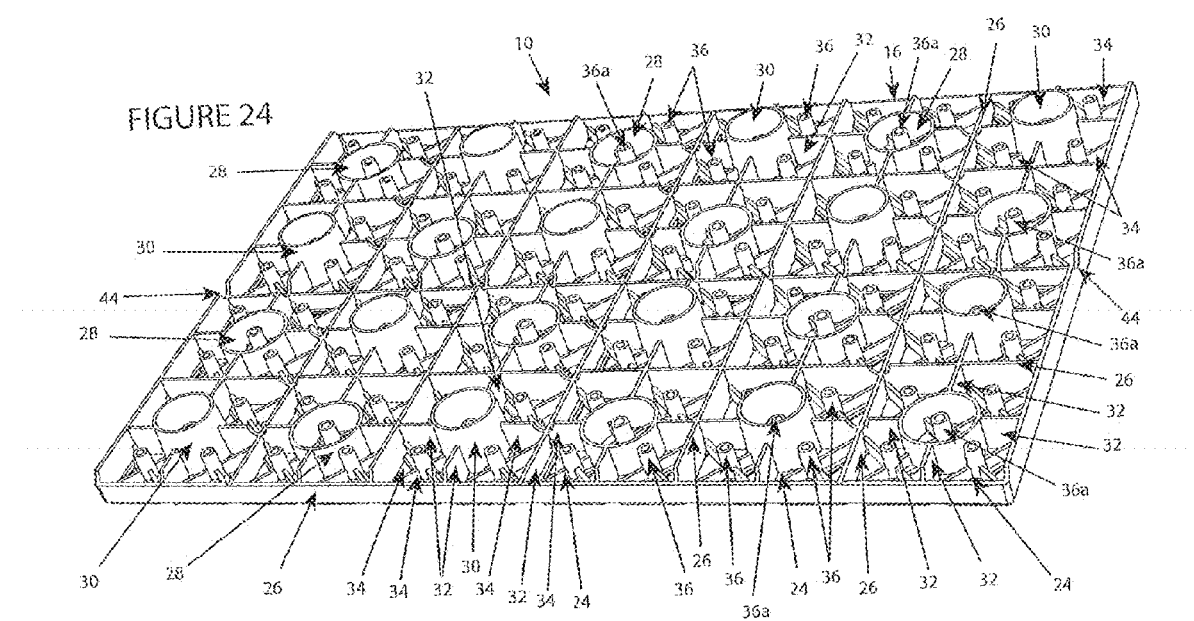
FIG. 24 is an isometric view showing the second surface of a single construction panel of FIG. 22.
Figure 25:
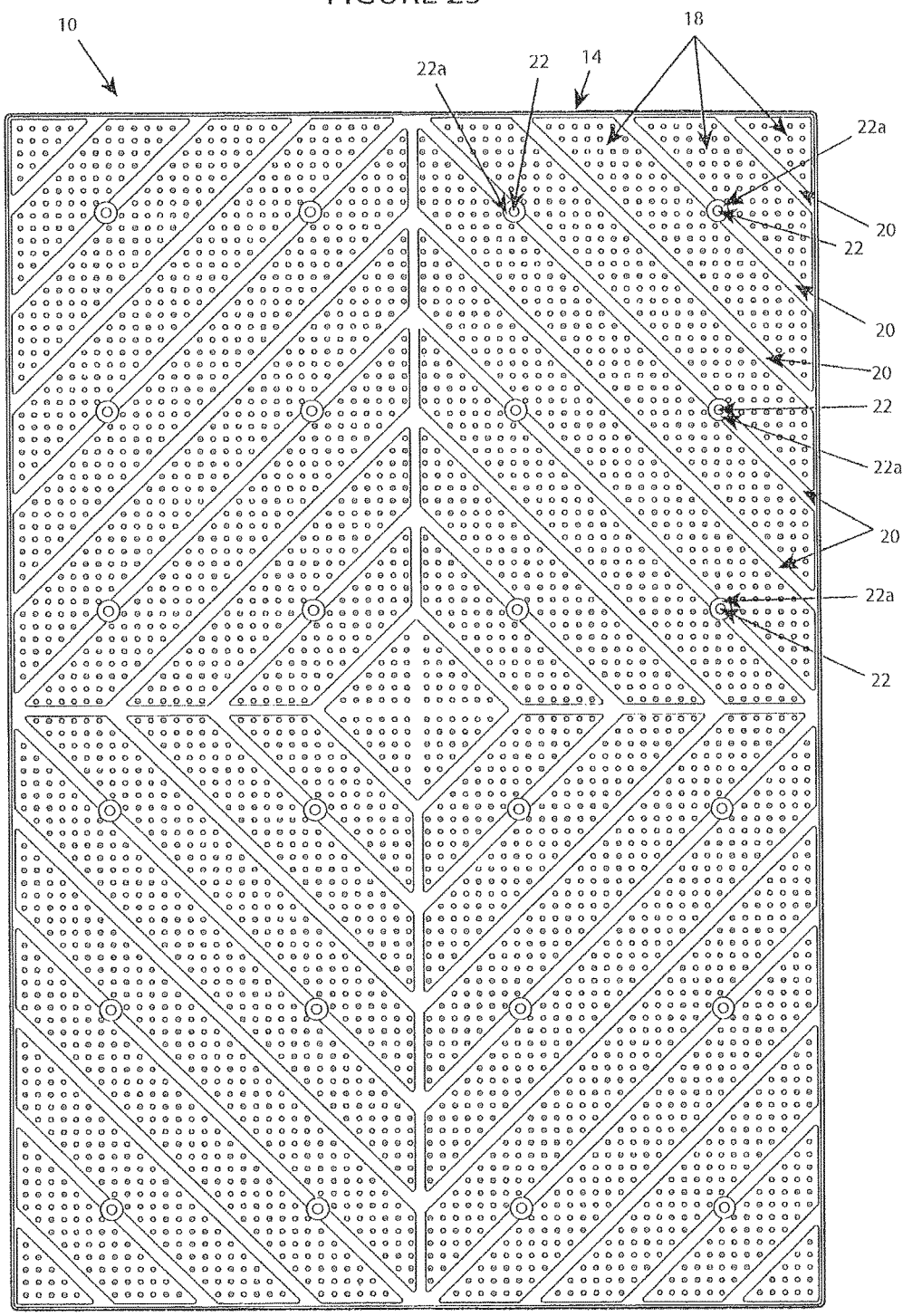
FIG. 25 is an enlarged, top plan view of the first surface of the panel of FIG. 22.
Figure 26:
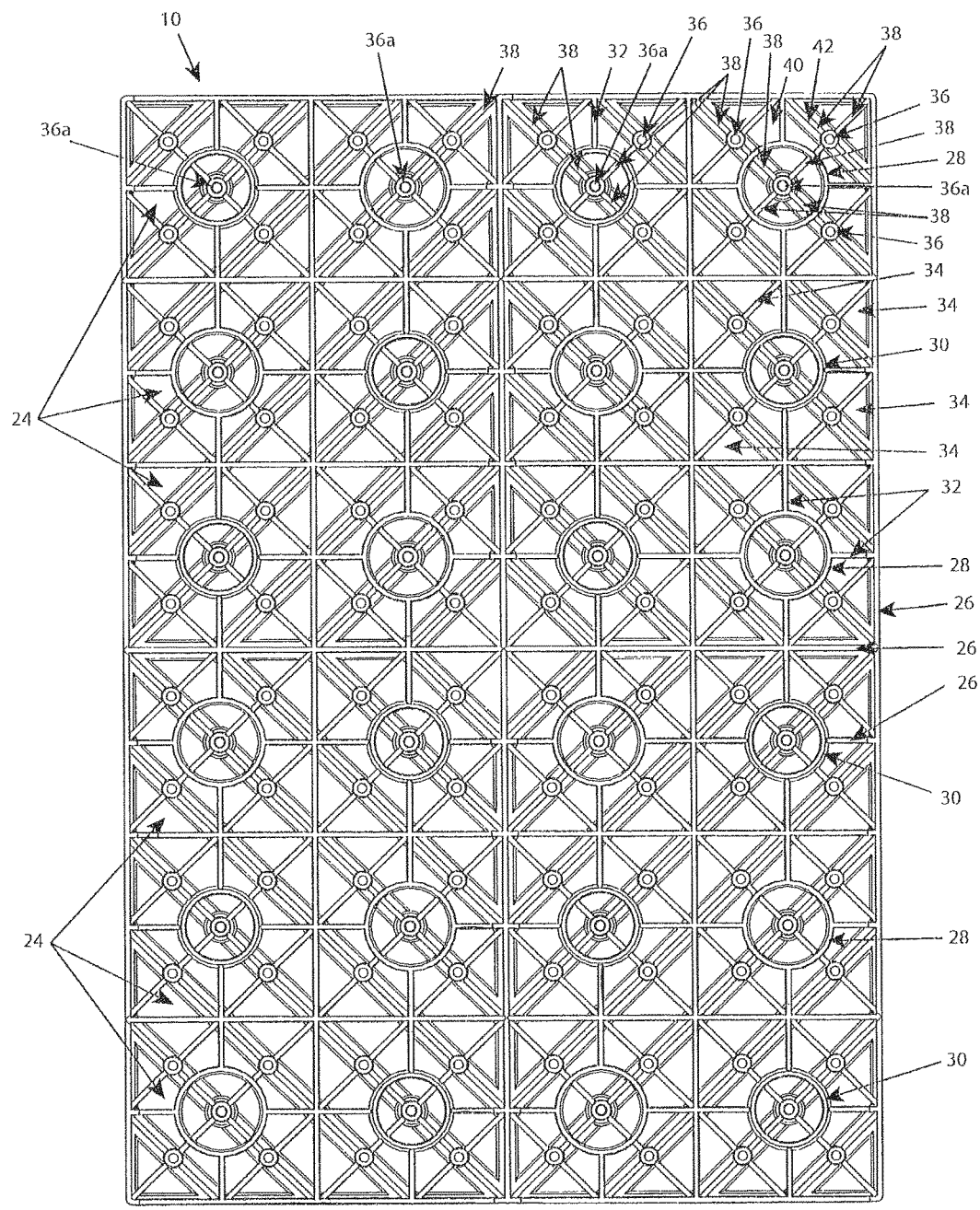
FIG. 26 is an enlarged, top plan view of a second surface of the panel of FIG. 22.
Figure 27:
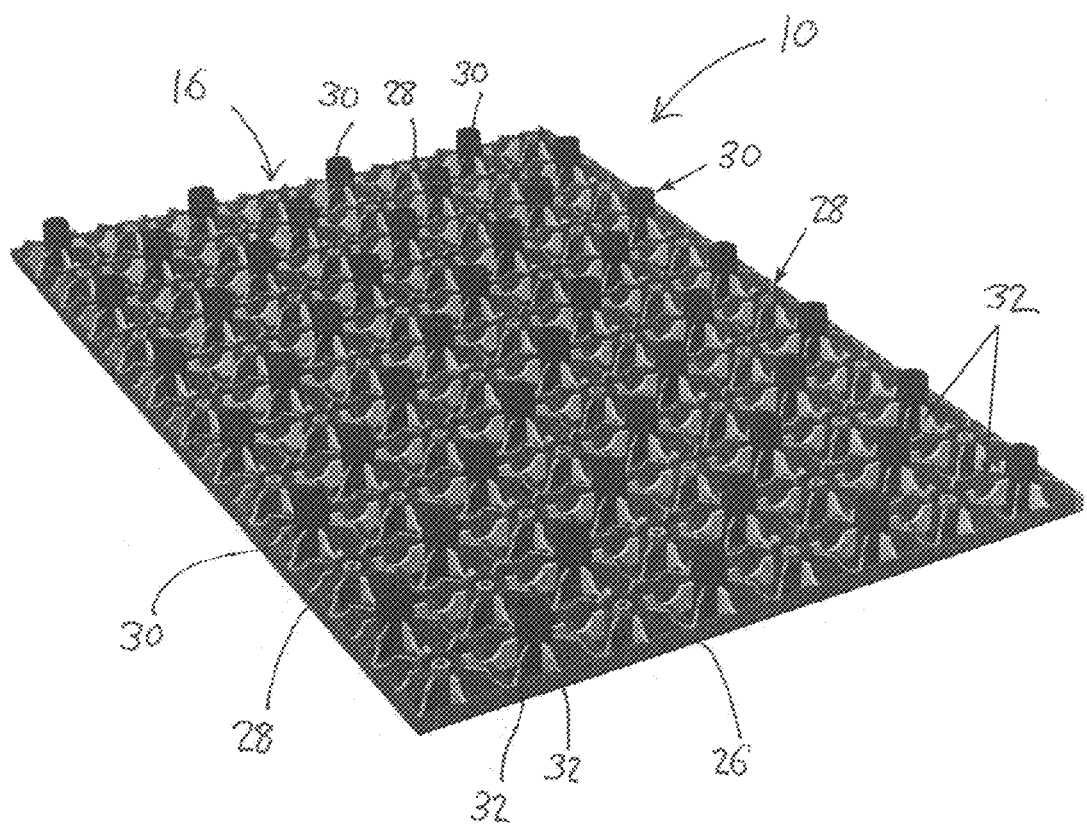
FIG. 27 is an isometric view showing the second side of a construction panel in accordance with a further alternative embodiment of the invention.
Figure 27A:
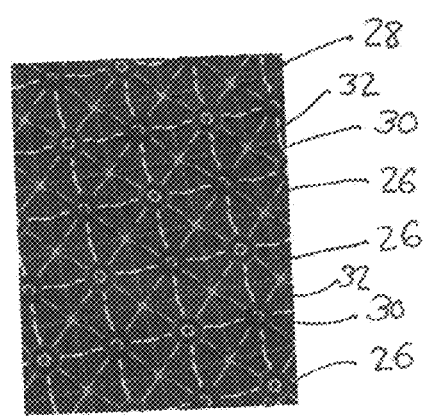
FIG. 27A is an enlarged top view of a portion of the panel of FIG. 27.
Figure 28:
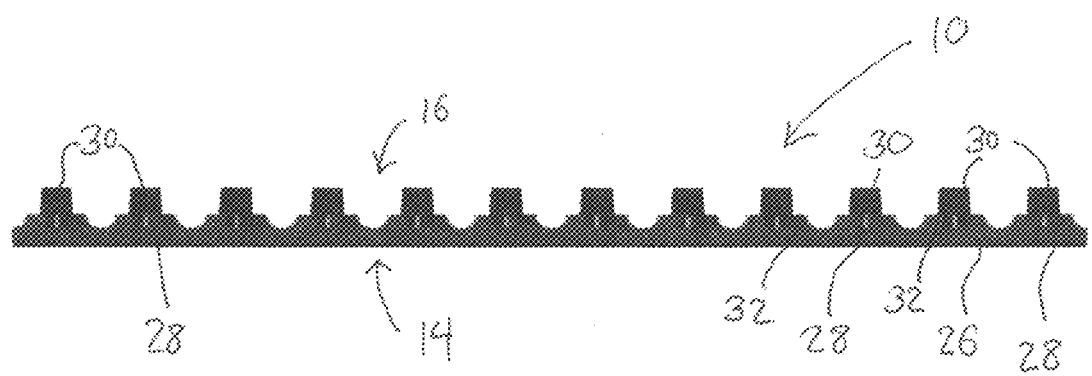
FIG. 28 is a side elevational view of the panel of FIG. 27.
Figure 29:
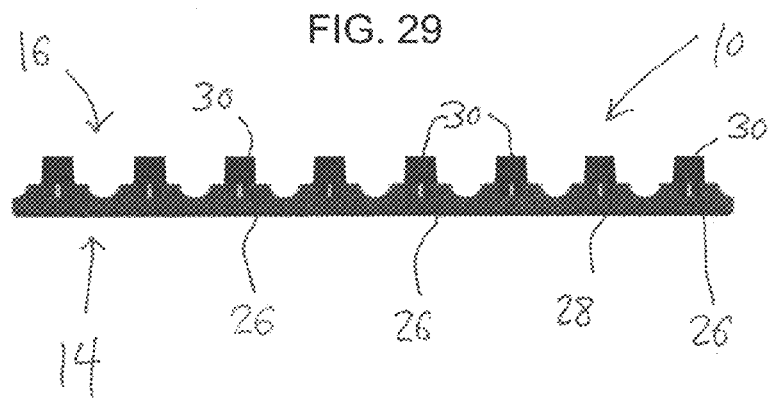
FIG. 29 is an end elevational view of the panel of FIG. 27.

The embodiment of FIGS. 27-50 comprises a larger number of compartments 24 and wall partitions 26, 32 in comparison, for example, to the panels 10 of FIGS. 17 and 24. Thus each panel 10 can have a more narrow profile than other embodiments of the invention while maintaining sufficient strength for a wide variety of consumer applications. By way of non-limiting example, wall partitions 26 may be spaced 4 inches apart (FIG. 35) and may be 3/16" in thickness. The length and height of panel 10 may be 48"×32" in this example; the resulting assembly 12 (FIG. 40) may have an interlocked height of approximately 2-3 inches. Each panel 10 may be formed from molded plastic or other light-weight materials and may be reusable and recyclable. In one embodiment, the total weight of panel 10 may be approximately 20 pounds. Since panel 10 of FIGS. 27-50 has a narrow profile, it may be manufactured more quickly in a conventional plastic mold (e.g. 2½ minutes as compared to 7½ minutes) and at lower cost than other embodiments requiring more plastic.

Figure 49:
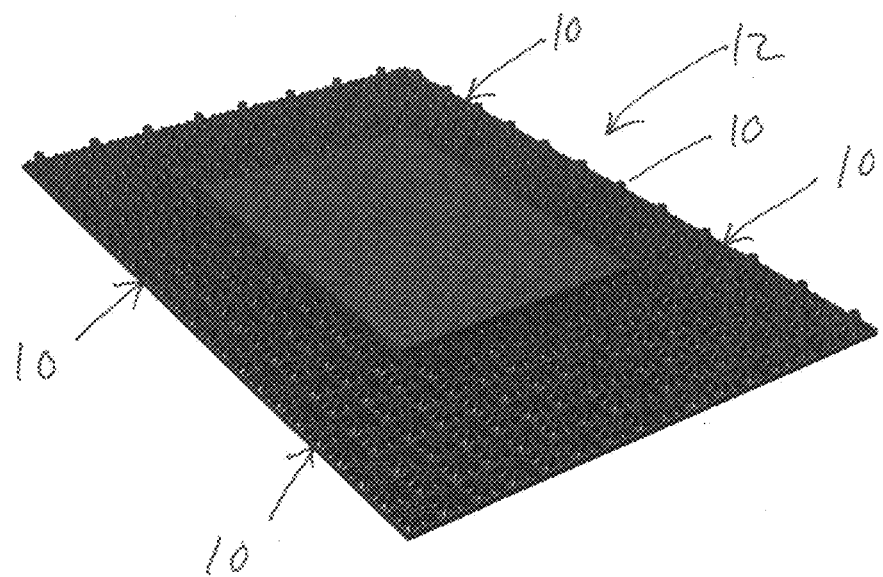
FIG. 49 is an isometric view of an assembly comprising four bottom panels aligned adjacent one another in a 2×2 pattern interconnected by a single centrally disposed overlapping top panel.
Figure 50:
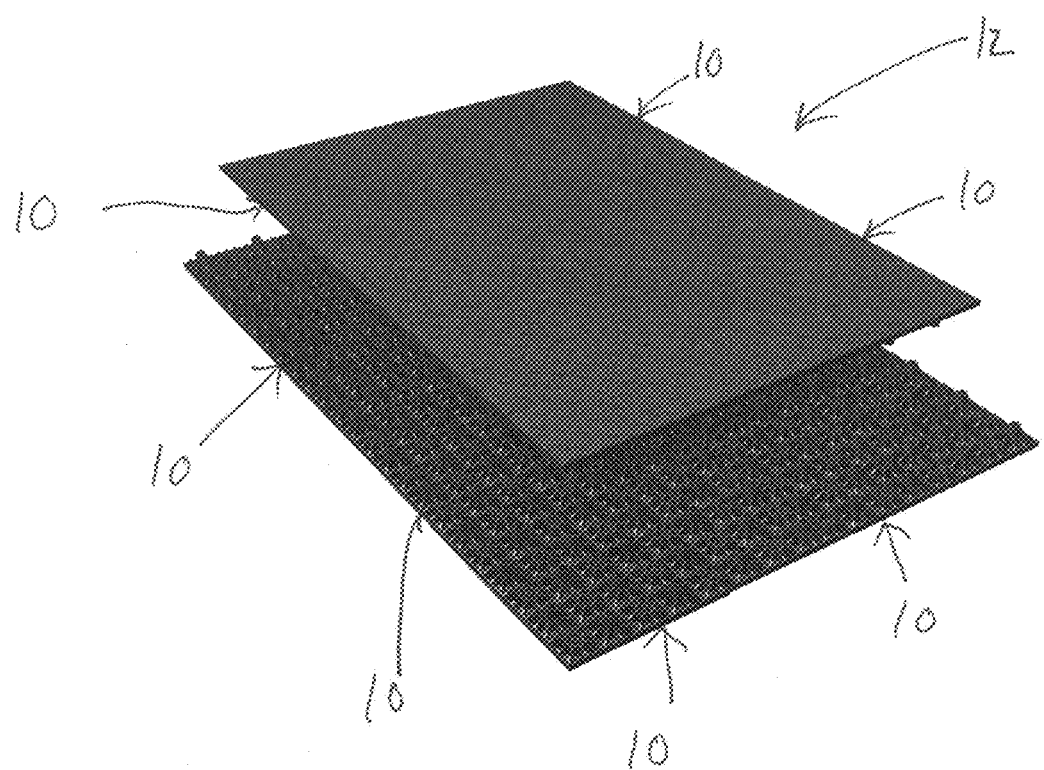
FIG. 50 is a perspective view of an assembly comprising four bottom panels interconnected by four overlapping top panels, the top and bottom panels being offset by half a panel in both longitudinal and lateral directions.

As in other embodiments of the invention, panels 10 may be coupled together in offset, interlocking patterns to form assemblies 12 comprising two or more panels 10 (FIGS. 46-50). Thus a first panel 10 may either be aligned directly above an underlying second panel 10 or misaligned with an underlying second panel 10. For example, as shown in FIG. 49, one upper panel 10 may overlap four different lower panels 10 to couple the lower panels 10 together. Panels 10 may be cut to cover non-overlapping portions after full-size panels 10 are coupled together (e.g. the non-overlapping portions shown in FIG. 50).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A construction panel having a first side and a second side, wherein said first side comprises a substantially planar deck and said second side comprises:
   (a) a plurality of first wall elements defining a plurality of compartments therebetween; and
   (b) a plurality of sleeves each located in one of said compartments, wherein said sleeves comprise a first group of female sleeves having a first height and a second group of male sleeves having a second height exceeding said first height, wherein said female and male sleeves are arranged within said compartments in an alternating array, wherein said female and male sleeves alternate regularly in said array in both longitudinal and transverse directions, and wherein said sleeves are sized such that, when said construction panel is releasably connected to another one of said construction panel to form a construction assembly, said male sleeves of said construction panel are sized to fit within said female sleeves of said another one of said construction panel and said female sleeves of said construction panel are sized to receive said male sleeves of said another one of said construction panel,
wherein each of said compartments is further subdivided into a plurality of subcompartments defined by a plurality of second wall elements, each of said second wall elements extending between one of said first wall elements and one of said sleeves,
and wherein a plurality of channels are defined by at least some of said first wall elements for receiving fluid delivery tubes.

2. The panel as defined in claim 1, comprising a plurality of spaced-apart apertures extending through said panel between said first and second sides.

3. The panel as defined in claim 1, wherein said sleeves are cylinders each having an open end at a location furthest from said deck.

4. The panel as defined in claim 3, wherein said female sleeves have a diameter exceeding a diameter of said male sleeves.

5. The panel as defined in claim 1, comprising a plurality of guide tubes, wherein each of said guide tubes is located within one of said subcompartments.

6. The panel as defined in claim 5, comprising a plurality of spaced-apart apertures extending through said panel between said first and second sides, wherein each of said guide tubes is aligned with one of said apertures.

7. The panel as defined in claim 6, wherein each of said guide tubes further comprises a support rib connecting said tube to a corresponding one of said sleeves.

8. A construction assembly comprising at least two construction panels each as defined in claim 1 coupled together, wherein said second side of one of said panels releasably engages said second side of another one of said panels.

9. The assembly as defined in claim 8, wherein said assembly comprises a first group of said panels arranged adjacent one another with said first and second sides in alignment and a second group of said panels arranged adjacent one another with said first and second sides in alignment, wherein said second sides of said first group of panels engages said second sides of said second group of panels, wherein at least some of said panels in said second group overlap multiple panels in said first group to connect said multiple panels together.

10. The assembly as defined in claim 9, wherein each of said panels comprises a plurality of guide tubes, wherein at least some of said guide tubes are located within a corresponding one of said subcompartments.

11. The assembly as defined in claim 10, wherein said guide tubes of said one of said panels is aligned with said guide tubes of said another one of said panels.

12. The assembly as defined in claim 11, comprising a plurality of spaced-apart apertures extending through each of said panels between said first and second sides thereof, wherein each of said guide tubes is aligned with an aligned pair of said apertures.

13. The assembly as defined in claim 12, wherein at least some of said guide tubes are located within said male and female sleeves.

14. The assembly as defined in claim 13, further comprising support flanges connected to said guide tubes.

15. The assembly as defined in claim 13, further comprising notches surrounding at least some of said apertures on said first side of said panel.

16. The assembly as defined in claim 8, wherein said plurality of channels defined on each of said panels together define a plurality of conduits extending between said panels within said assembly when said panels are coupled together.

17. The assembly as defined in claim 16, wherein said conduits extend transversely.

18. The assembly as defined in claim 16, wherein said conduits extend longitudinally.

19. The assembly as defined in claim 16, comprising a fluid delivery tube positioned in at least some of said conduits.

20. The assembly as defined in claim 8, wherein said assembly has a narrow profile less 3 inches when said panels are coupled together.

21. The panel as defined in claim 1, wherein said channels extend transversely.

22. The panel as defined in claim 1, wherein said channels extend longitudinally.

23. The panel as defined in claim 1, wherein one of said channels is defined above each of said first wall elements.

24. The panel as defined in claim 1, wherein said channels extend in parallel relation and are spaced less than 6 inches apart.

25. The panel as defined in claim 1, wherein each of said second wall portions comprises a radiused portion at a location distal from a corresponding one of said sleeves adjacent a first wall portion.

26. The panel as defined in claim 1, wherein at least some of said sleeves have a bolt post positioned therein.

27. The panel as defined in claim 26, comprising a plurality of spaced-apart apertures extending through said panel between said first and second sides, wherein each of said bolt post is aligned with one of said apertures.

28. The panel as defined in claim 27, wherein said bolt post is internally threaded for receiving a bolt.

* * * * *